(12) United States Patent
Kanamarlapudi et al.

(10) Patent No.: US 12,200,707 B2
(45) Date of Patent: Jan. 14, 2025

(54) TRAFFIC AWARE REGULAR BUFFER STATUS REPORTS

(71) Applicant: QUALCOMM INCORPORATED, San Diego, CA (US)

(72) Inventors: Sitaramanjaneyulu Kanamarlapudi, San Diego, CA (US); Manjinder Singh Sandhu, Poway, CA (US); Harish Bhandiwad, San Diego, CA (US); Kavya Putluri, San Diego, CA (US); Touseef Khan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 406 days.

(21) Appl. No.: 17/449,920

(22) Filed: Oct. 4, 2021

(65) Prior Publication Data

US 2022/0110145 A1 Apr. 7, 2022

Related U.S. Application Data

(60) Provisional application No. 63/198,238, filed on Oct. 5, 2020.

(51) Int. Cl.
*H04W 72/21* (2023.01)
*H04L 1/1812* (2023.01)
(Continued)

(52) U.S. Cl.
CPC ........... *H04W 72/21* (2023.01); *H04L 1/1819* (2013.01); *H04W 72/1263* (2013.01); *H04W 72/23* (2023.01); *H04W 72/542* (2023.01)

(58) Field of Classification Search
CPC . H04W 72/21; H04W 72/1263; H04W 72/23; H04W 72/542; H04W 72/569;
(Continued)

(56) References Cited

U.S. PATENT DOCUMENTS 11,540,346 B1 * 12/2022 Velusamy ............. H04W 76/15
2013/0331137 A1 * 12/2013 Burchill ..................... H04L 1/20
455/501
(Continued)

FOREIGN PATENT DOCUMENTS

EP 3996399 A1 * 5/2022 ............ H04W 16/14
WO WO-2016091298 A1 * 6/2016

OTHER PUBLICATIONS

International Search Report and Written Opinion—PCT/US2021/053609—ISA/EPO—Feb. 1, 2022.

*Primary Examiner* — Ayaz R Sheikh
*Assistant Examiner* — Mang Boi Thawng
(74) *Attorney, Agent, or Firm* — Dalei Dong; Haynes and Boone, LLP

(57) ABSTRACT

Wireless communications techniques related to buffer status reports (BSRs) are provided. In some aspects, a method of wireless communication performed by a user equipment (UE) includes: determining a buffer status report (BSR) condition is present based on a condition of an application; determining an uplink grant is not available for the UE to transmit data, related to the application, in a buffer of the UE within a period of time; removing the data from the buffer; resubmitting, to the buffer, at least a portion of the data removed from the buffer; and transmitting, to a base station (BS), at least one of a BSR or a scheduling request (SR) based at least in part on the resubmitting the at least the portion of the data to the buffer. Other aspects and features are also claimed and described.

29 Claims, 10 Drawing Sheets

(51) Int. Cl.
*H04W 72/1263* (2023.01)
*H04W 72/23* (2023.01)
*H04W 72/542* (2023.01)

(58) Field of Classification Search
CPC ..... H04L 1/1819; H04L 1/188; H04L 1/1887; H04L 1/1874
See application file for complete search history.

(56) References Cited

U.S. PATENT DOCUMENTS

| | | | |
|---|---|---|---|
| 2017/0127441 A1* | 5/2017 | Chandrasekhar | H04W 72/23 |
| 2019/0037001 A1* | 1/2019 | Fujishiro | H04L 1/0009 |
| 2019/0230552 A1* | 7/2019 | Yu | H04W 80/02 |
| 2019/0253201 A1* | 8/2019 | Ye | H04L 1/1822 |
| 2020/0137785 A1* | 4/2020 | Deogun | H04W 72/569 |
| 2020/0196185 A1* | 6/2020 | Babaei | H04W 72/21 |
| 2022/0256576 A1* | 8/2022 | Wu | H04W 72/21 |

* cited by examiner

TRAFFIC AWARE REGULAR BUFFER STATUS REPORTS

CROSS-REFERENCE TO RELATED APPLICATIONS

The present application claims priority to and the benefit of U.S. Provisional Application No. 63/198,238, filed Oct. 5, 2020, the entirety of which is hereby incorporated by reference.

TECHNICAL FIELD

The technology described below relates generally to wireless communication systems, and more particularly, to buffer status report (BSR) techniques.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR is also designed to support dual connectivity with LTE via a split bearer configuration. For instance, a UE may be simultaneously connected to an NR BS and an LTE BS for uplink and/or downlink communications. A radio bearer is a service provided by Layer 2 to transport user data packets and/or signaling data between a UE and a network. A radio bearer that transports user data may be referred to as a data radio bearer (DRB). A radio bearer that transports signaling data may be referred to as a signaling radio bearer (SRB). A split bearer in dual connectivity refers to a radio bearer that transports data between a UE and a network via two radio interface protocols over two wireless communication links (e.g., a NR link and an LTE link).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some aspects, a method of wireless communication performed by a user equipment (UE) includes: determining a buffer status report (BSR) condition is present based on a condition of an application; determining an uplink grant is not available for the UE to transmit data, related to the application, in a buffer of the UE within a period of time; and transmitting, to a base station (BS), at least one of a BSR or a scheduling request (SR) based at least in part on the BSR condition being present and the uplink grant not being available for the UE to transmit the data in the buffer of the UE within the period of time.

In some aspects, a user equipment (UE) comprises: a processor configured to: determine a buffer status report (BSR) condition is present based on a condition of an application; and determine an uplink grant is not available for the UE to transmit data, related to the application, in a buffer of the UE within a period of time; and a transceiver in communication with the processor, the transceiver configured to: transmit, to a base station (BS), at least one of a BSR or a scheduling request (SR) based at least in part on processor determining the BSR condition is present and the uplink grant is not available for the UE to transmit the data in the buffer of the UE within the period of time.

In some aspects, a non-transitory computer-readable medium having program code recorded thereon for wireless communication by a user equipment (UE) is provided. The program code can include: code for causing the UE to determine a buffer status report (BSR) condition is present based on a condition of an application; code for causing the UE to determine an uplink grant is not available for the UE to transmit data, related to the application, in a buffer of the UE within a period of time; and code for causing the UE to transmit, to a base station (BS), at least one of a BSR or a scheduling request (SR) based at least in part on the BSR condition being present and the uplink grant not being available for the UE to transmit the data in the buffer of the UE within the period of time.

In some aspects, a user equipment (UE) comprises: means for determining a buffer status report (BSR) condition is present based on a condition of an application; means for determining an uplink grant is not available for the UE to transmit data, related to the application, in a buffer of the UE within a period of time; and means for transmitting, to a base station (BS), at least one of a BSR or a scheduling request (SR) based at least in part on the BSR condition being present and the uplink grant not being available for the UE to transmit the data in the buffer of the UE within the period of time.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device,

DETAILED DESCRIPTION

Figure 1:
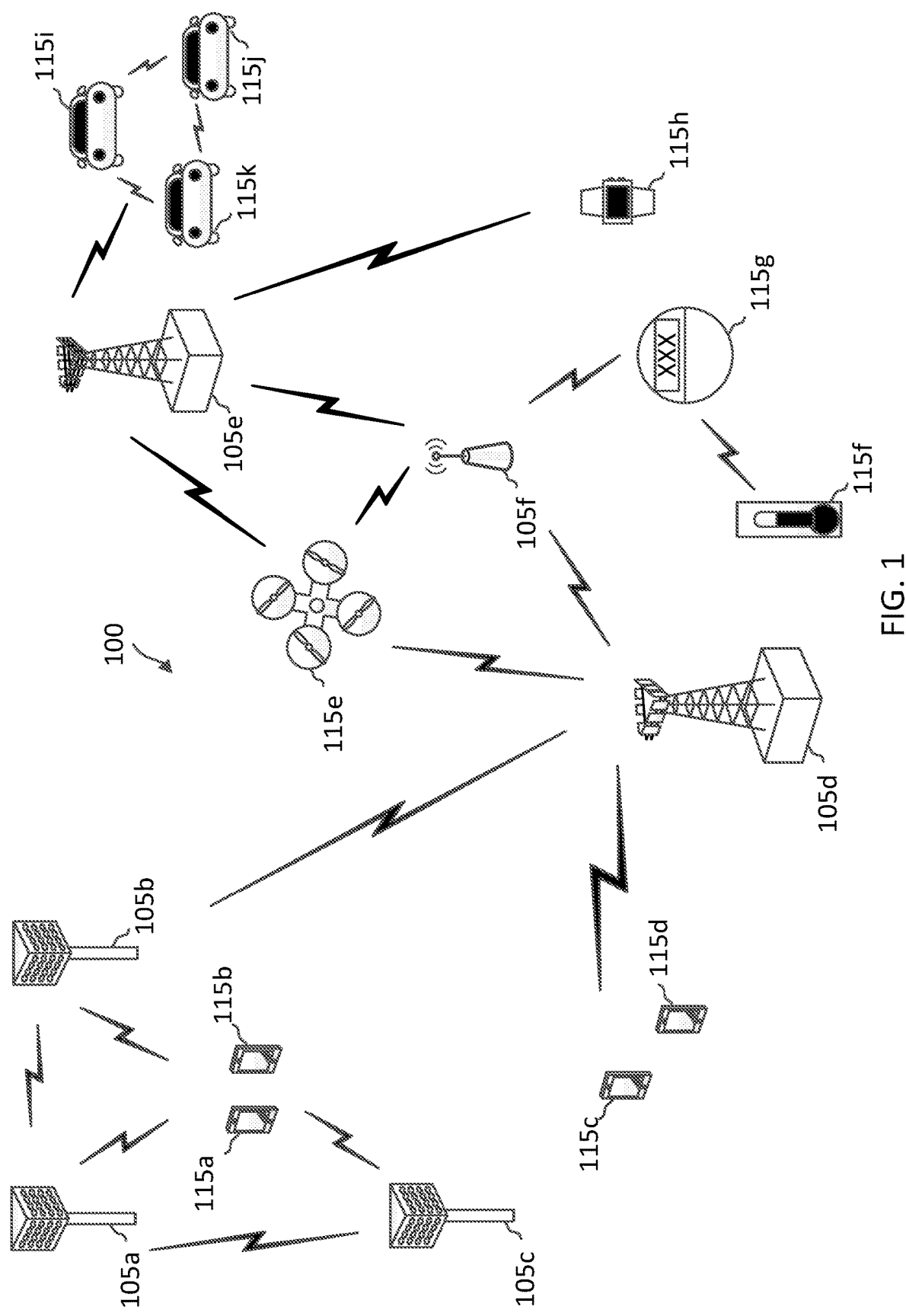
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. A BS 105 may be terrestrial (e.g., attached to or part of a tower, building, vehicle, or other structure on earth) or non-terrestrial (e.g., attached to or part of a satellite, balloon, or other device separate from earth). The BS 105 may provide access to a terrestrial radio access technology (RAT) (e.g., NR, LTE, 3G, etc.) or a non-terrestrial RAT (e.g., a satellite-based RAT). Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may include one or more sensors (e.g., temperature sensor(s), motion sensor(s), accelerometer(s), pressure sensor(s), speed/velocity sensor(s), etc.). A UE 115 may be coupled to and/or in communication with one or more external sensors (e.g., temperature sensor(s), motion sensor(s), accelerometer(s), pressure sensor(s), speed/velocity sensor(s), etc.).

A UE 115 may be able to communicate with any type of the BSs, whether macro BS, small cell, or the like. Also, a UE 115 may be able to communicate with a terrestrial BS or a non-terrestrial BS. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a backoff indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may implement a split bearer in a ETURA NR-dual connectivity (EN-DC) configuration. A radio bearer is a service provided by Layer 2 to transport user data packets and/or signaling data between a UE and a network. A radio bearer that transports user data may be referred to as a data radio bearer (DRB). A radio bearer that transports signaling data may be referred to as a signaling radio bearer (SRB). The split bearer may transport data between a UE 115 and the network 100 via two radio interface protocols over two wireless communication links (e.g., a NR link and an LTE link). In NR and LTE radio interface protocols, Layer 2 may include several sublayers, such as a PDCP sublayer, a RLC sublayer, and a MAC sublayer. The PDCP sublayer may receive data packets from an upper layer (e.g., transmission control protocol/Internet protocol (TCP/IP) layer) and transport the data packets via the RLC sublayer, the MAC sublayer, and a physical (PHY) layer for OTA transmission. At the receiver side, data packets are received via a PHY layer, a MAC sublayer, an RLC sublayer, and a PDCP layer, which delivers the data packets to an upper layer. In a split bearer configuration, data may be split post-PDCP and transmitted through different RLC/MAC/PHY layers to a peer side as described in greater detail herein.

In some aspects, the UE 115 may be a multi-subscriber identity module (multi-SIM) UE, such as a dual-SIM, dual-standby (DSDS) user equipment and/or a dual-SIM, dual-active (DSDA) user equipment. In this regard, the UE 115 may be configured to use a first wireless communication link to communicate with a first network via a first subscription and use a different second wireless communication link to communicate with a second network via a different second subscription. The UE 115 may receive voice services, data services, or both using the first wireless communication link via the first subscription. The UE 115 may receive voice services, data services, or both using the different second wireless communication link via the different second subscription. In some instances, the first subscription and the different second subscription may be maintained by different wireless carriers or mobile network operators. In some instances, the first subscription and the different second subscription may be maintained by the same wireless carrier or mobile network operator.

Figure 2:
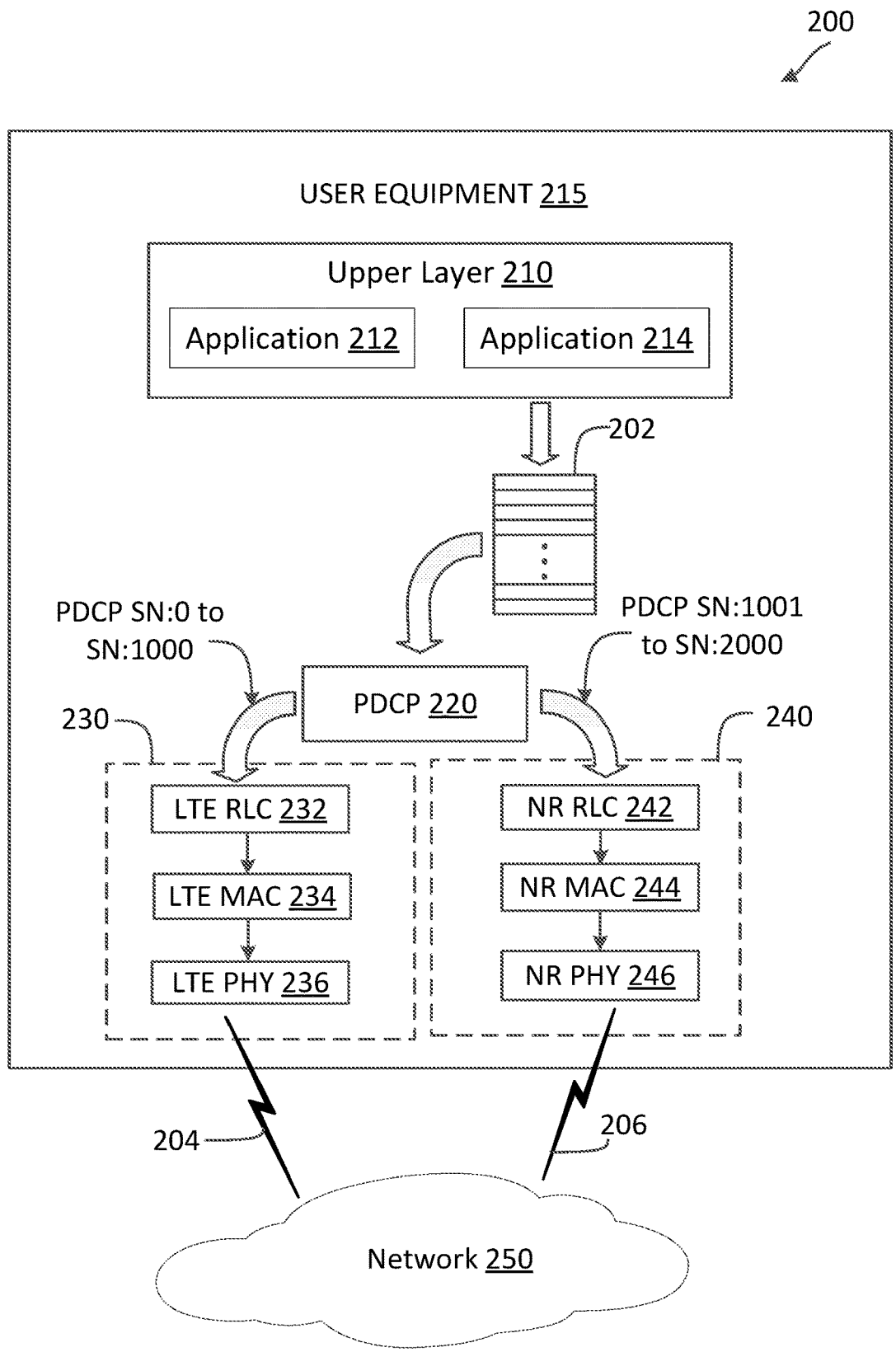
FIG. 2 illustrates a wireless communication network according to some aspects of the present disclosure.

FIG. 2 illustrates a wireless communication network 200 according to some aspects of the present disclosure. The wireless communication network can operate in stand-alone mode and/or in a dual-connectivity or multi-connectivity mode. In this regard, though the figure shows a dual-connectivity arrangement, additional degrees of connectivity can be implemented. The network 200 may correspond to a portion of the network 100. In particular, the network 200 may configure a UE such as the UE 115 to implement a split bearer configuration for UL transmission as shown in FIG. 2. FIG. 2 shows a UE 215 communicatively coupled to a network 250 via a wireless communication link 204 and a wireless communication link 206. In some aspects, the communication link 204 is an LTE wireless communication link and the wireless communication link 206 is a NR wireless communication link. The UE 215 may correspond to a UE 115 of FIG. 1 or UE 800 of FIG. 8. As shown, the UE 215 can include an upper layer entity 210, a PDCP entity 220, and two radio interface protocol entities 230 and 240. The upper layer entity 210 may include or execute one or more application modules (e.g., application 212, application 214) and a network stack, such as TCP/IP. The radio interface protocol entities 230 and 240 can provide two separate UL transmission paths to the network 250 (e.g., the BSs 105 and the core network). The UE 215 may include hardware and/or software components configured to implement the upper layer entity 210, the PDCP entity 220, and the radio interface protocol entities 230 and 240.

As shown in FIG. 2, in some instances the radio interface protocol entity 230 implements an LTE RAT and the radio interface protocol entity 240 implements an NR RAT. The LTE radio interface protocol entity 230 includes an LTE RLC entity 232, an LTE MAC entity 234, and an LTE PHY entity 236. The NR radio interface protocol entity 240 includes an NR RLC entity 242, an NR MAC entity 244, and an NR PHY entity 246. In some instances, a split radio bearer configuration can be applied to an NR-NR dual connectivity mode. In other words, the radio interface protocol entities 230 and 240 can both be NR radio interface protocol entities and the wireless communication links 204 and 206 are NR communication links. In some other instances, the split radio bearer can be configured between other suitable RATs. Further, in some instances, the UE operates in stand-alone mode using only one of the radio interface protocol entities 230 or 240 connected to a single RAT (e.g., LTE or NR).

The PDCP entity 220 may provide services to the upper layer entity 210, for example, including transfer of user plane data, header compression and decompression, ciphering and integrity protection, maintenance of PDCP sequence numbers, and in-sequence packet delivery. The PDCP entity 220 may receive acknowledged data transfer service (including indication of successful delivery of PDCP PDU) and/or unacknowledged data transfer services from the LTE RLC entity 232 and/or the NR RLC entity 242.

The radio interface protocol entities 230 and 240 may operate independent of each other but may provide substantially similar services and/or functionalities. RLC entities 232 and 242 may perform packet concatenation, segmentation, re-segmentation, and reassembly, and/or ARQ. In some instances, the LTE RLC entity 232 may perform packet reordering, whereas the NR RLC entity 242 may not perform packet reordering since packet reordering may be performed at the PDCP entity 220 for NR. In the transmitting path, the MAC entities 234 and 244 may perform mapping between logical channels and transport channels, multiplexing of MAC service data units (SDUs) from one or different logical channels onto transport blocks (TBs) to be delivered to corresponding entities 236 and 246 on transport channels, respectively, and/or HARQ retransmissions. In the receiving path, the MAC entities 234 and 244 may perform demultiplexing of MAC SDUs from one or different logical channels from TBs delivered from the corresponding PHY entities 236 and 246 on transport channels, respectively, scheduling information reporting, error correction through HARQ, and/or facilitate quality of service (QoS) handling. The PHY entities 236 and 246 carry data information to and from corresponding MAC entities 234 and 244, respectively. The PHY entities 236 and 246 may perform cell search, cell measurements, error coding, error decoding, modulation, demodulation, and/or physical channel scheduling and reporting.

In some aspects, the PDCP entity 220 receives data packets from the upper layer entity 210 and buffers the data packets in a UL PDCP queue 202 (e.g., at a buffer memory). For example, in some instances the PDCP entity 220 receives data packets from an application module (e.g., application 212 and/or application 214) and buffers the data packets for the application module in the UL PDCP queue 202 or buffer. Data can be buffered in a general memory, a specific memory, a dedicated memory array, and/or one or more areas in a memory storage. To aid in buffering, utilized memory storage may be designated for buffering though such designations are not necessary. Buffer memory may be a stand-alone memory storage and/or can be integrated into a general memory providing buffering. In some cases, buffering can be specific to PDCP PDUs where a buffer may only hold PDCP data. In some instances, the buffer memory is part of a modem of the UE 215.

As one example, a PDCP entity may add PDCP packet headers to data packets (e.g., upper layer packets) and perform sequence numbering to associate each data packet with a sequence number in an ascending order. The PDCP entity 220 may store the data packets along with the PDCP packet headers and associated sequence numbers at the UL PDCP queue 202. The data packets may be stored in a sequential order according to the sequence numbers. The data packets may be referred to as PDCP packets or PDCP PDUs. When operating in a dual-connectivity mode, the PDCP entity 220 may route a portion of the packets to the radio interface protocol entity 230 and another portion of the packets to the radio interface protocol entity 240 for transmissions to the network 250. A PDCP packet being transmitted via the LTE radio interface protocol entity 230 may be processed by the LTE RLC entity 232, the LTE MAC entity 234, and the LTE PHY entity 236 prior to transmission over the wireless communication link 204 (e.g., a LTE link). Similarly, a PDCP packet being transmitted via the NR radio interface protocol entity 240 may be processed by the NR RLC entity 242, the NR MAC entity 244, and NR PHY entity 246 prior to transmission over the wireless communication link 206 (e.g., a NR link). In some instances, when operating in a stand-alone mode the PDCP entity 220 may route all the packets to one of the radio interface protocol entities 230 and/or 240.

In some aspects, each of the LTE-RLC entity 232 and the NR-RLC entity 242 may have a buffer queue and may store transmitted packets along with a RLC sequence numbers in the RLC buffer queue. Since the LTE RLC entity 232 and the NR RLC entity 242 can operate independently, each LTE RLC entity 232 and the NR-RLC entity 242 may maintain its own RLC packet sequence numbers and perform ARQ processing separately in some instances. Network 250 may transmit RLC acknowledgements (ACKs)/negative-acknowledgements (NACKs) to the UE 215 via a corresponding link using a corresponding RAT. For instance, for a packet transmitted via the LTE wireless communication link 204, the UE 215 may receive an ACK or a NACK via the LTE wireless communication link 204. Alternatively, for a packet transmitted via the NR wireless communication link 206, the UE 215 may receive an ACK or a NACK via the NR wireless communication link 206. For each received ACK at the LTE RLC entity 232, the LTE RLC entity 232 may report the ACK to the PDCP entity 220. Upon receiving a NACK, the LTE RLC entity 232 may retransmit a corresponding packet to the network 250. Similarly, for each received ACK or NACK at the NR RLC entity 242, the NR RLC entity 242 may report the ACK or NACK to the PDCP entity 220. Upon receiving a NACK, the NR RLC entity 242 may retransmit a corresponding packet to the network 250.

In some aspects, the LTE PHY entity 236 may use different transmission time intervals (TTIs) and/or UL scheduling timeline than the NR PHY entity 246 for OTA transmissions. For instance, the LTE PHY entity 236 may use a TTI of about 1 millisecond (ms) while the NR PHY entity 246 may use a TTI of about 0.125 ms. Additionally, the LTE PHY entity 236 may have a UL grant scheduling delay of about 3 TTIs (e.g., about 3 ms) while the NR PHY entity 246 may schedule a UL grant in the same slot (e.g., <0.125 ms). Accordingly, the wireless communication link 204 and the wireless communication link 206 may have different throughputs and/or different retransmission timeline. Additionally, the wireless communication link 204 and the wireless communication link 206 may have different channel conditions (e.g., different signal-to-noise ratios (SNRs) and/or different block error rates (BLERs)). For instance, the wireless communication link 204 may have a lower throughput, a lower SNR, and/or a lower BLER than the wireless communication link 206. The different throughputs and/or channel conditions over the wireless communication links 204 and 206 may have an impact on the amount of data required to be buffered in the UL PDCP queue 202.

Further, when the UE 215 transitions between different configurations the amount of data buffered in the UL PDCP queue 202 may be impacted. For example, during dynamic radio environments (e.g., based on the RRC/L2/PHY layer, channel quality (CSF), and/or other metrics), the network 250 may reconfigure the UE 215 to different configurations through radio bearer procedures. Similarly, the UE 215 might initiate a procedure (e.g., radio link failure) due to radio conditions that results in a reconfiguration procedure for the UE 215. These reconfigurations can be within the same RAT (e.g., to different parameters/carriers/etc.), to a different RAT (e.g., as fallback/redirection/handover), and/or between dual-connectivity and standalone modes (e.g., from dual-connectivity to standalone, or from standalone to dual-connectivity). During reconfigurations, as well as steady state operations, the UE 215 may encounter delays in UL transmissions that cause data from an application module (e.g., application 212 or 214) to build up in the UL PDCP queue 202, which can adversely affect performance of the application and user satisfaction. In this regard, while the UE 215 is experiencing delays in UL transmissions (e.g., as a result of reconfiguration and/or connectivity issues), the PDCP entity 220 may continue to receive new packets. These packets may be received from the upper layer entity 210, such as from an application module (e.g., application 212 and/or 214). As a result, the number of packets held at the buffer can continue to increase and eventually the buffer may be full (or reach a threshold of interest (e.g., 90% capacity)).

In accordance with 3gpp TS 38.321 v.16.2, Section 5.4.5 Buffer Status Reporting, which is hereby incorporated by reference in its entirety, the UE may send BSRs to the network. In this regard, there are three different types of BSRs that may be triggered: a regular BSR, a periodic BSR, and a padding BSR. A regular BSR can be triggered by (1) higher priority logical channel data arriving into a logical channel group compared to the data present in the logical channel group; (2) a zero to non-zero buffer transition (e.g., arrival of new data); or (3) expiration of a BSR retransmission timer. A periodic BSR can be triggered by expiration of a periodic timer. A padding BSR can be triggered by padding bytes being available after the logical channel prioritization (LCP) procedure. On the trigger of a BSR (e.g., regular, periodic, or padding), the UE can, if uplink grants are available, attempt to transmit the data in the buffer and/or BSR information based on the LCP procedure, available bytes, available grants, etc. If no uplink grants are available, then a scheduling request (SR) process may be initiated by the UE if the BSR triggered is a regular BSR. That is, periodic BSR and padding BSR may not trigger the initiation of the SR procedure. Accordingly, in some cases only a regular BSR can trigger the initiation of a SR procedure and associated transmission of a scheduling request (SR) to the BS 105 when no uplink resources are available. This can lead to unwanted delays in uplink data transmissions that adversely affect the performance of the application(s) running on the UE.

These types of issues can be particularly exacerbated for applications that generate data at regular intervals (e.g., video streams, virtual reality, augmented reality, video games, audio streams, etc.). For example, packet delays and/or drops may cause an application generating an audio/video stream to be jittery, unstable, or otherwise negatively impact the user's experience. In some instances, the video quality may be degraded (e.g., due to a codec adaptation based on perceived lack of throughput for the UL data) and not recover, other than through trial and error-based approaches rather than a BSR-based approach. As described below, aspects of the present disclosure provide solutions to these issues that can facilitate improved data throughput, smoother execution of application(s), better user experiences, and/or more efficient use of network resources.

Figure 3:
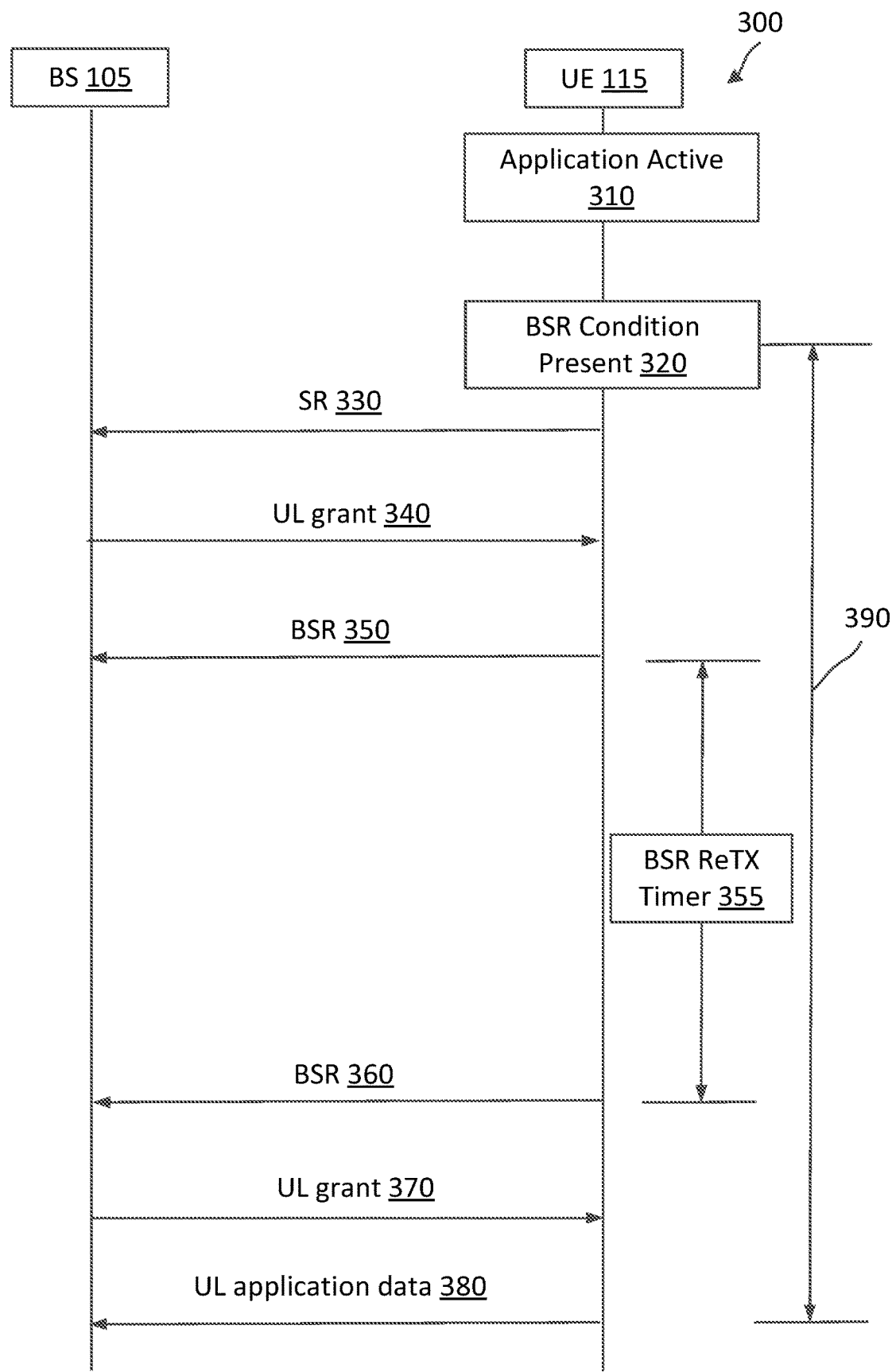
FIG. 3 is a signaling diagram illustrating a BSR technique according to some aspects of the present disclosure.

FIG. 3 is a signaling diagram illustrating a buffer status report (BSR) technique 300 according to some aspects of the present disclosure. As shown, at 310, an application (e.g., application 212 and/or 214) of the UE 115 is active. Accordingly, the application may be generating uplink data that is stored in a buffer (e.g., as discussed above with respect to FIG. 2) prior to transmission over a communication link. For example, the application may generate uplink data that is stored in a buffer of a modem of the UE.

At 320, a BSR condition may be present. In accordance with the present disclosure, the presence of the BSR condition at 320 can trigger a regular BSR. In this regard, the regular BSR can be triggered based on the BSR condition even if under normal BSR procedures (e.g., under 3gpp TS 38.321 v.16.2, Section 5.4.5 Buffer Status Reporting) a regular BSR may not be triggered. Accordingly, in some instances the presence of the BSR condition causes the UE to utilize enhanced BSR procedures (see, e.g., FIG. 7).

In some aspects of the present disclosure, the BSR condition is present at 320 when one or more conditions are present. The conditions may be based on a status of the application, a buffer status, a network connection status, and/or other conditions associated with a UE, an application running on the UE, and/or a network. For example, in some instances, the BSR condition is at least partially based on an application of the UE being active. In some instances, the active status of the application is determined based on at least one of an IP tuple, a quality of service (QoS) flow indicator (QFI), or an application-specific indicator associated with the application. In some cases, the BSR condition is at least partially based on the application encountering one or more performance issues related to the transmission of UL data packets. For example, in some instances the BSR condition is at least partially based on the application dropping one or more packets, changing a codec (e.g., moving to a lower resolution codec and/or a lower bandwidth codec), and/or otherwise adjusting performance parameters as a result of issues related to the transmission (or lack thereof) of UL data packets.

In some instances, the BSR condition is at least partially based on the UE transitioning between a dual connectivity mode and a stand-alone mode (e.g., from dual connectivity to stand-alone, or vice versa). In some cases, the BSR condition is at least partially based on the UE transitioning between a dual connectivity LTE and NR mode to an LTE-only mode. In some instances, the BSR condition is at least partially based on the type of RAT the UE is connected to or supported by the BS, including for example whether the UE is connected to a terrestrial RAT (e.g., NR, LTE, 3G, etc.) and/or a non-terrestrial RAT (e.g., a satellite-based RAT). In some instances, the BSR condition is at least partially based on the type of BS the UE is connected to, including for example whether the UE is connected to a terrestrial BS (e.g., a BS attached to or part of a tower, building, vehicle, or other structure on earth), a non-terrestrial BS (e.g., a BS attached to or part of a satellite, balloon, or other device separate from earth), and/or other type(s) of BS. In some instances, the BSR condition is at least partially based on whether the UE is operating in a dual active and/or a dual standby mode (e.g., when the UE is a multi-SIM UE).

In some instances, the BSR condition is at least partially based on data in the buffer of the UE related to the application satisfying a threshold. In this regard, the threshold can be based on an amount of data, an amount of time, and/or a combination of an amount of data and an amount of time. The particular value(s) of the threshold(s) may be based on the operating parameters of the application and/or user detectability of delays in successfully clearing the data from the buffer via an uplink transmission. Accordingly, in some instances the threshold amount of data and/or the threshold time may be set to facilitate the operation of the application in a manner that preserves a good user experience. In some instances, the threshold(s) may be variable or change over time based on a status (e.g., UL data load) of the application.

In some instances, the BSR condition is at least partially based on an uplink grant not being available for the UE to transmit data in a buffer of the UE within a period of time. In some instances, the data in the buffer is related to the application. In some cases, the period of time is based on the operating parameters of the application. For example, applications that generate real-time data streams (e.g., video and/or audio) may have relatively strict timing requirements (e.g., 100-150 ms) before jitter, freezing, and/or other issues adversely affect the user's experience with the application. Accordingly, in some instances the period of time in which the UE determines an UL grant is not available to transmit the data in the buffer may be based on the timing requirements needed for operation of the application in a manner that preserves a good user experience. In some instances, the period of time may be variable or change over time based on a status (e.g., UL data load) of the application.

In some instances, the BSR condition is at least partially based on a condition of one or more sensors (e.g., temperature sensor(s), motion sensor(s), accelerometer(s), pressure sensor(s), speed/velocity sensor(s), etc.) associated with the UE. The UE may include the one or more sensors and/or be coupled to and/or in communication with one or more external sensors. In some instances, the BSR condition is based on a measurement of one or more of the sensors satisfying a threshold (e.g., above or below a temperature threshold, above or below a pressure threshold, above or below a motion threshold, above or below a speed/velocity threshold, etc.).

At 330, the UE transmits a scheduling request (SR) to the BS 105. In some cases, the UE does not have any available UL grants for transmitting data and/or a BSR upon determining that the BSR condition is present at 320. Accordingly, the UE may transmit the SR to the BS at 330.

At 340, the BS 105 grants uplink resources to the UE and transmits an UL grant to the UE indicating the UL resources. In some instances, the BS 105 grants the UE 115 uplink resources sufficient to transmit a BSR (e.g., a regular BSR) to the BS with the uplink grant. However, the uplink grant, at 340, may be insufficient to allow the UE 115 to transmit the uplink data related to the application in the buffer of the UE to the BS 105.

At 350, the UE 115 transmits a BSR to the BS 105. In some instances, the UE 115 transmits a regular BSR at 350. The transmission of the regular BSR at 350 will start a BSR retransmission timer 355, as shown. In this regard, the BSR retransmission timer 355 may have a fixed length (e.g., 300 ms). During this time, and the preceding time since the BSR condition became present, the active application may continually generate new data. However, because the data generated by the application can be the same priority as the other data related to the application in the LCG and the buffer is not moving from a zero to non-zero state (since it always has data stored), a regular BSR will not be triggered under normal BSR procedures. As a result, the data may continue to build up in the buffer, which can result in packet delays and/or drops that may negatively impact the user's experience of the application.

Following expiration of the BSR retransmission timer 355, the UE 115 can transmit a further BSR to the BS 105 at 360. In some instances, the UE 115 transmits a regular BSR at 360.

At 370, the BS 105 grants uplink resources to the UE and transmits an UL grant to the UE indicating the UL resources.

In some instances, the BS 105 grants the UE 115 uplink resources sufficient to begin transmitting the uplink data related to the application stored in the buffer of the UE 115.

At 380, the UE 115 begins transmitting the UL data related to the application stored in the buffer of the UE. However, due to the delay 390 from the BSR condition becoming present at 320 and the UE beginning to transmit the UL data at 380, the user's experience may be negatively affected (e.g., jitter, skipping, freezing, etc.). In this regard, the delay 390 may be between 500 ms and 1,000 ms, or more, in some instances.

Figure 4:
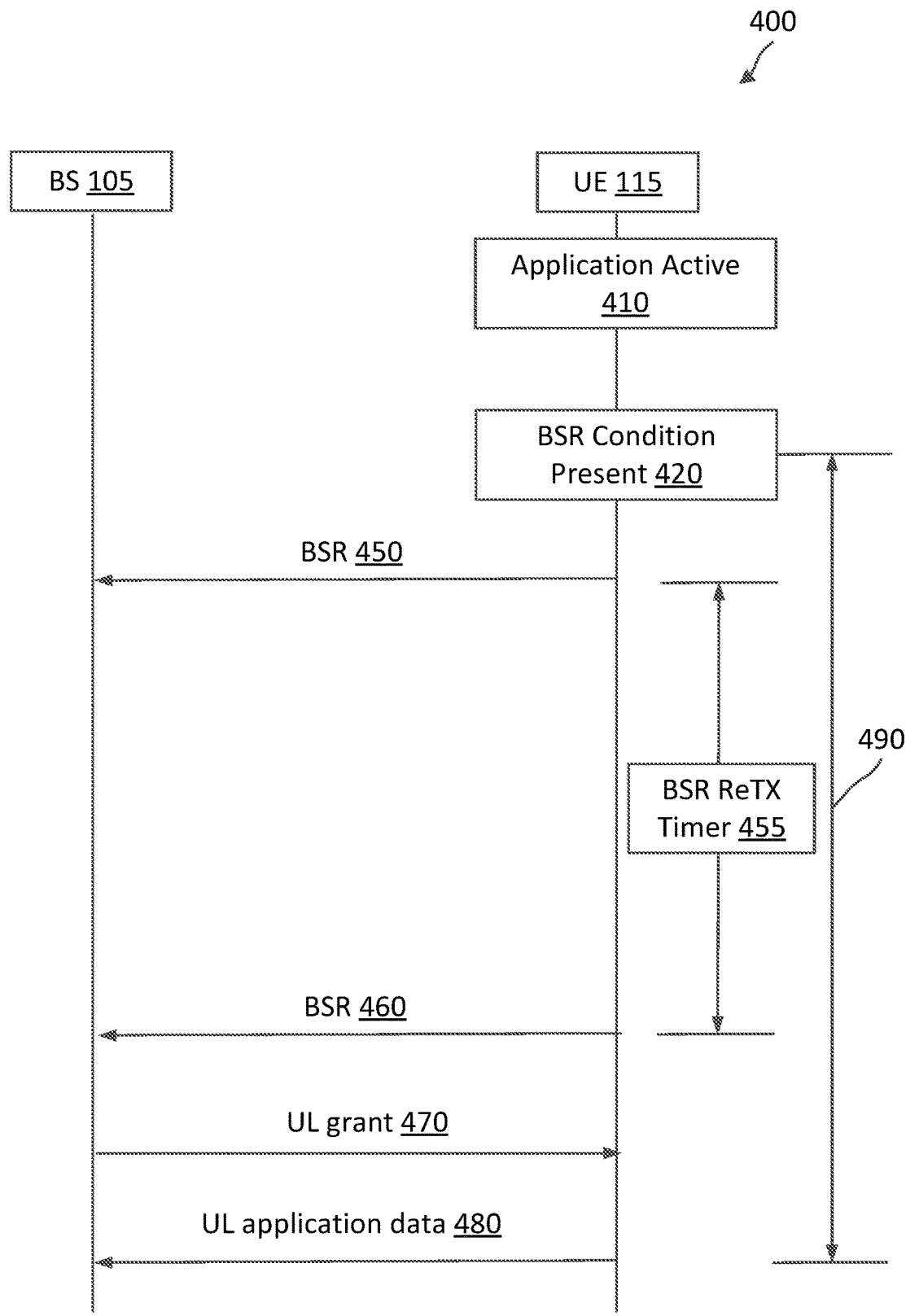
FIG. 4 is a signaling diagram illustrating a BSR technique according to some aspects of the present disclosure.

FIG. 4 is a signaling diagram illustrating a BSR technique 400 according to some aspects of the present disclosure. The BSR technique 400 is similar in many respects to the BSR technique 300 described above with respect to FIG. 3. Accordingly, some of details described above with respect to BSR technique 300 are not repeated here. As shown, however, for the BSR technique 400 the UE 115 has an uplink grant that allow the UE to transmit a BSR to the BS 105 without first transmitting an SR to the BS 105.

As shown, at 410, an application (e.g., application 212 and/or 214) of the UE 115 is active. Accordingly, the application may be generating uplink data that is stored in a buffer (e.g., as discussed above with respect to FIG. 2) prior to transmission over a communication link. For example, the application may generate uplink data that is stored in a buffer of a modem of the UE.

At 420, a BSR condition may be present. In accordance with the present disclosure, the presence of the BSR condition at 420 can trigger a regular BSR. In this regard, the regular BSR can be triggered based on the BSR condition even if under normal BSR procedures (e.g., under 3gpp TS 38.321 v.16.2, Section 5.4.5 Buffer Status Reporting) a regular BSR may not be triggered. Accordingly, in some instances the presence of the BSR condition causes the UE to utilize enhanced BSR procedures (see, e.g., FIG. 7). As discussed above, in some aspects of the present disclosure, the BSR condition is present at when one or more conditions are present. The conditions may be based on a status of the application, a buffer status, a network connection status, and/or other conditions associated with a UE, an application running on the UE, and/or a network.

At 450, the UE 115 transmits a BSR to the BS 105. In some cases, the UE has available UL grants for transmitting the BSR upon determining that the BSR condition is present at 420. In some instances, the UE 115 transmits a regular BSR at 450. The transmission of the regular BSR at 450 will start a BSR retransmission timer 455, as shown.

Following expiration of the BSR retransmission timer 455, the UE 115 can transmit a further BSR to the BS 105 at 460. In some instances, the UE 115 transmits a regular BSR at 460.

At 470, the BS 105 grants uplink resources to the UE and transmits an UL grant to the UE indicating the UL resources. In some instances, the BS 105 grants the UE 115 uplink resources sufficient to begin transmitting the uplink data related to the application stored in the buffer of the UE 115.

At 480, the UE 115 begins transmitting the UL data related to the application stored in the buffer of the UE. However, due to the delay 490 from the BSR condition becoming present at 420 and the UE beginning to transmit the UL data at 480, the user's experience may be negatively affected (e.g., jitter, skipping, freezing, etc.). In this regard, the delay 490 may be between 400 ms and 1,000 ms, or more, in some instances.

Figure 5:
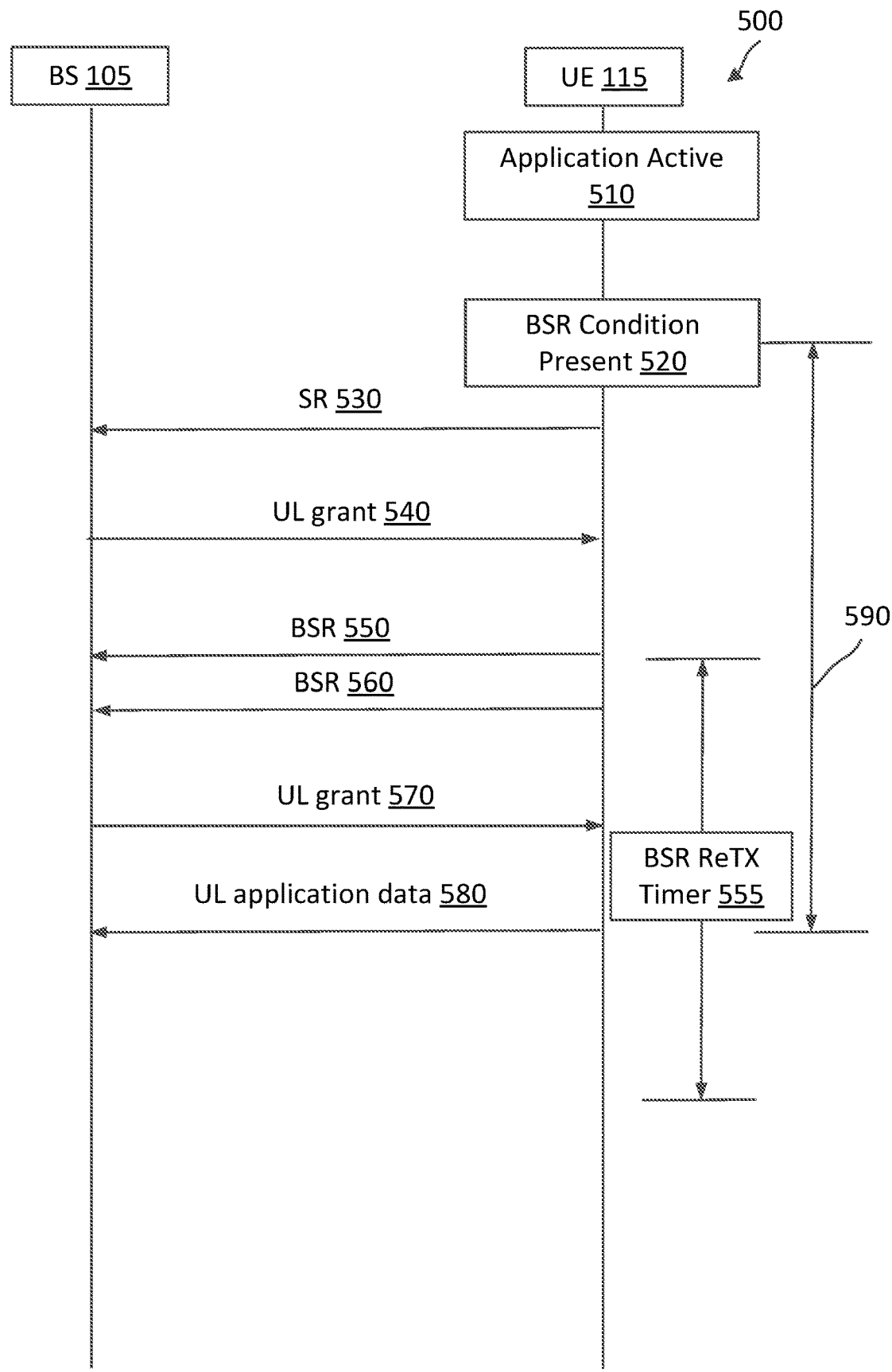
FIG. 5 is a signaling diagram illustrating a BSR technique according to some aspects of the present disclosure.

FIG. 5 is a signaling diagram illustrating a BSR technique 500 according to some aspects of the present disclosure. The BSR technique 500 is similar in some respects to the BSR technique 300 described above with respect to FIG. 3 in terms of the UE not initially having an uplink grant for transmitting uplink data and/or a BSR. However, as shown, the BSR technique 500 can avoid unwanted delays in UL data transmissions and, thereby, improve user satisfaction and experiences with the application compared to the BSR technique 300 through the use of enhanced BSR procedures.

As shown, at 510, an application (e.g., application 212 and/or 214) of the UE 115 is active. Accordingly, the application may be generating uplink data that is stored in a buffer (e.g., as discussed above with respect to FIG. 2) prior to transmission over a communication link. For example, the application may generate uplink data that is stored in a buffer of a modem of the UE.

At 520, a BSR condition may be present. In accordance with the present disclosure, the presence of the BSR condition at 520 can trigger a regular BSR. In this regard, the regular BSR can be triggered based on the BSR condition being present at 520 even if under normal BSR procedures (e.g., under 3gpp TS 38.321 v.16.2, Section 5.4.5 Buffer Status Reporting) a regular BSR may not be triggered. Accordingly, in some instances the presence of the BSR condition causes the UE to utilize enhanced BSR procedures (see, e.g., FIG. 7).

In some aspects of the present disclosure, the BSR condition is present at 520 when one or more conditions are present. The conditions may be based on a status of the application, a buffer status, a network connection status, and/or other conditions associated with a UE, an application running on the UE, and/or a network. For example, in some instances, the BSR condition is at least partially based on an application of the UE being active. In some instances, the active status of the application is determined based on at least one of an IP tuple, a quality of service (QoS) flow indicator (QFI), or an application-specific indicator associated with the application. In some cases, the BSR condition is at least partially based on the application encountering one or more performance issues related to the transmission of UL data packets. For example, in some instances the BSR condition is at least partially based on the application dropping one or more packets, changing a codec (e.g., moving to a lower resolution codec and/or a lower bandwidth codec), and/or otherwise adjusting performance parameters as a result of issues related to the transmission (or lack thereof) of UL data packets.

In some instances, the BSR condition is present at least partially based on the UE transitioning between a dual connectivity mode and a stand-alone mode (e.g., from dual connectivity to stand-alone, or vice versa). In some cases, the BSR condition is present at least partially based on the UE transitioning between a dual connectivity LTE and NR mode to an LTE-only mode. In some instances, the BSR condition is at least partially based on the type of RAT the UE is connected to or supported by the BS, including for example whether the UE is connected to a terrestrial RAT (e.g., NR, LTE, 3G, etc.) and/or a non-terrestrial RAT (e.g., a satellite-based RAT). In some instances, the BSR condition is at least partially based on the type of BS the UE is connected to, including for example whether the UE is connected to a terrestrial BS (e.g., a BS attached to or part of a tower, building, vehicle, or other structure on earth), a non-terrestrial BS (e.g., a BS attached to or part of a satellite, balloon, or other device separate from earth), and/or other type(s) of BS. In some instances, the BSR condition is at least partially based on whether the UE is operating in a dual active and/or a dual standby mode (e.g., when the UE is a multi-SIM UE).

In some instances, the BSR condition is present at least partially based on data in the buffer of the UE related to the application satisfying a threshold. In this regard, the threshold can be based on an amount of data, an amount of time, and/or a combination of an amount of data and an amount of time. The particular value(s) of the threshold(s) may be based on the operating parameters of the application and/or user detectability of delays in successfully clearing the data from the buffer via an uplink transmission. Accordingly, in some instances the threshold amount of data and/or the threshold time may be set to facilitate the operation of the application in a manner that preserves a good user experience. In some instances, the threshold(s) may be variable or change over time based on a status (e.g., UL data load) of the application.

In some instances, the BSR condition is at least partially based on a condition of one or more sensors (e.g., temperature sensor(s), motion sensor(s), accelerometer(s), pressure sensor(s), speed/velocity sensor(s), etc.) associated with the UE. The UE may include the one or more sensors and/or be coupled to and/or in communication with one or more external sensors. In some instances, the BSR condition is based on a measurement of one or more of the sensors satisfying a threshold (e.g., above or below a temperature threshold, above or below a pressure threshold, above or below a motion threshold, above or below a speed/velocity threshold, etc.).

In some instances, the BSR condition is present at least partially based on an uplink grant not being available for the UE to transmit data in a buffer of the UE within a period of time. In some instances, the data in the buffer is related to the application. In some cases, the period of time is based on the operating parameters of the application. For example, applications that generate real-time data streams (e.g., video and/or audio) may have relatively strict timing requirements (e.g., 100-150 ms) before jitter, freezing, and/or other issues adversely affect the user's experience with the application. Accordingly, in some instances the period of time in which the UE determines an UL grant is not available to transmit the data in the buffer may be based on the timing requirements needed for operation of the application in a manner that preserves a good user experience. In some instances, the period of time may be variable or change over time based on a status (e.g., UL data load) of the application.

At 530, the UE transmits a scheduling request (SR) to the BS 105. In some cases, the UE does not have any available UL grants for transmitting data and/or a BSR upon determining that the BSR condition is present at 520. Accordingly, the UE may transmit the SR to the BS at 530.

At 540, the BS 105 grants uplink resources to the UE and transmits an UL grant to the UE indicating the UL resources. In some instances, the BS 105 grants the UE 115 uplink resources sufficient to transmit a BSR (e.g., a regular BSR) to the BS with the uplink grant. However, the uplink grant, at 540, may be insufficient to allow the UE 115 to transmit the uplink data related to the application in the buffer of the UE to the BS 105.

At 550, the UE 115 transmits a BSR to the BS 105. In some instances, the UE 115 transmits a regular BSR at 550. The transmission of the regular BSR at 550 can start a BSR retransmission timer 555, as shown. In this regard, the BSR retransmission timer 555 may have a fixed length (e.g., 300 ms). However, contrary to the BSR technique 300 of FIG. 3, for the BSR technique 500 the UE does not wait for the BSR retransmission timer 555 to expire before transmitting another BSR at 560. That is, the UE can transmit a regular BSR at 560 instead of waiting for the BSR retransmission timer 555 to expire. In some instances, the UE can trigger the regular BSR at 560 by treating the BSR condition being present and not having uplink resources available for transmitting the data associated with the application in the buffer of the UE within a time period as a regular BSR trigger. Alternatively, in some instances the UE can trigger the regular BSR at 560 by treating the BSR condition being present and not having uplink resources available for transmitting the data associated with the application in the buffer of the UE within a time period to initiate removing data from the buffer to trigger either a zero to non-zero state change and/or higher priority data in the LCG.

At 570, the BS 105 grants uplink resources to the UE (in response to the BSR transmitted at 560) and transmits an UL grant to the UE indicating the UL resources. In some instances, the BS 105 grants the UE 115 uplink resources sufficient at 570 to begin transmitting the uplink data related to the application stored in the buffer of the UE 115.

At 580, the UE 115 begins transmitting the UL data related to the application stored in the buffer of the UE. As shown, the delay 590 from the BSR condition becoming present at 520 and the UE beginning to transmit the UL data at 580 is significantly reduced relative to the delay 390 of the BSR technique 300. In this regard, the delay 590 may be between 50 ms and 200 ms, or less, in some instances. As a result of the BSR technique 500, the user's experience of the application may be uninterrupted and not negatively affected (e.g., jitter, skipping, freezing, etc.).

Figure 6:
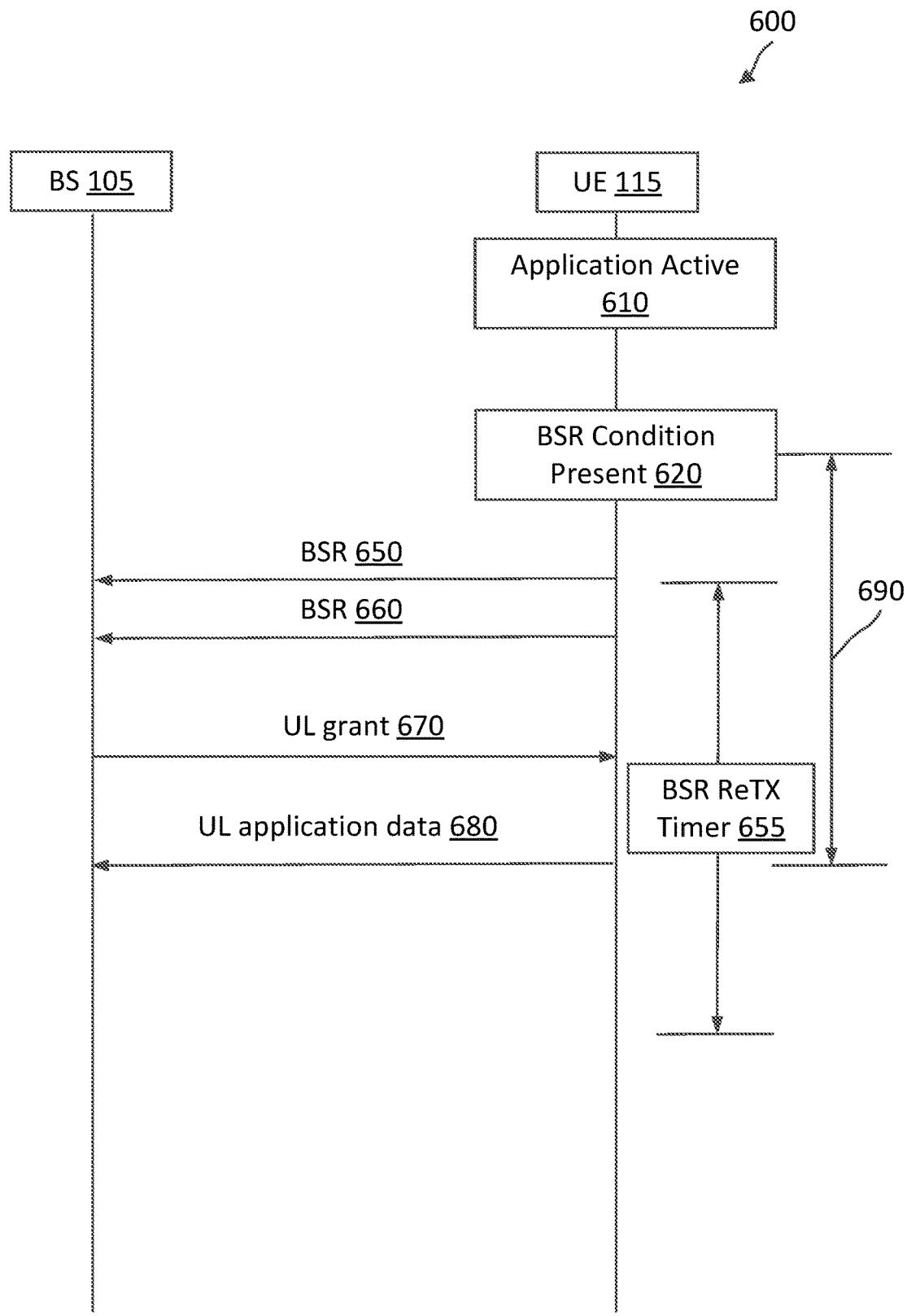
FIG. 6 is a signaling diagram illustrating a BSR technique according to some aspects of the present disclosure.

FIG. 6 is a signaling diagram illustrating a BSR technique 600 according to some aspects of the present disclosure. The BSR technique 600 is similar in some respects to the BSR technique 400 described above with respect to FIG. 4 in terms of the UE having an uplink grant for transmitting a BSR. However, as shown, the BSR technique 600 can avoid unwanted delays in UL data transmissions and, thereby, improve user satisfaction and experiences with the application compared to the BSR technique 400 through the use of enhanced BSR procedures. The BSR technique 600 is also similar in some respects to the BSR technique 500 described above with respect to FIG. 5. Accordingly, some of details described above with respect to BSR technique 500 are not repeated here.

As shown, at 610, an application (e.g., application 212 and/or 214) of the UE 115 is active. Accordingly, the application may be generating uplink data that is stored in a buffer (e.g., as discussed above with respect to FIG. 2) prior to transmission over a communication link. For example, the application may generate uplink data that is stored in a buffer of a modem of the UE.

At 620, a BSR condition may be present. In accordance with the present disclosure, the presence of the BSR condition at 620 can trigger a regular BSR. In this regard, the regular BSR can be triggered based on the BSR condition being present at 520 even if under normal BSR procedures (e.g., under 3gpp TS 38.321 v.16.2, Section 5.4.5 Buffer Status Reporting) a regular BSR may not be triggered. Accordingly, in some instances the presence of the BSR condition causes the UE to utilize enhanced BSR procedures (see, e.g., FIG. 7). As discussed above with respect to FIG. 5, in some aspects of the present disclosure, the BSR condition is present at when one or more conditions are present. The conditions may be based on a status of the application, a buffer status, a network connection status, and/or other conditions associated with a UE, an application running on the UE, and/or a network.

At 650, the UE 115 transmits a BSR to the BS 105. In some instances, the UE 115 transmits a regular BSR at 650. The transmission of the regular BSR at 650 can start a BSR retransmission timer 555, as shown. In this regard, the BSR retransmission timer 655 may have a fixed length (e.g., 300 ms). However, contrary to the BSR technique 400 of FIG. 4, for the BSR technique 600 the UE does not wait for the BSR retransmission timer 455 to expire before transmitting another BSR at 660. That is, the UE can transmit a regular BSR at 660 instead of waiting for the BSR retransmission timer 655 to expire. In some instances, the UE can trigger the regular BSR at 660 by treating the BSR condition being present and not having uplink resources available for transmitting the data associated with the application in the buffer of the UE within a time period as a regular BSR trigger. Alternatively, in some instances the UE can trigger the regular BSR at 660 by treating the BSR condition being present and not having uplink resources available for transmitting the data associated with the application in the buffer of the UE within a time period to initiate removing data from the buffer to trigger either a zero to non-zero state change and/or higher priority data in the LCG.

At 670, the BS 105 grants uplink resources to the UE (in response to the BSR transmitted at 660) and transmits an UL grant to the UE indicating the UL resources. In some instances, the BS 105 grants the UE 115 uplink resources sufficient at 670 to begin transmitting the uplink data related to the application stored in the buffer of the UE 115.

At 680, the UE 115 begins transmitting the UL data related to the application stored in the buffer of the UE. As shown, the delay 690 from the BSR condition becoming present at 620 and the UE beginning to transmit the UL data at 680 is significantly reduced relative to the delay 490 of the BSR technique 400. In this regard, the delay 690 may be between 20 ms and 200 ms, or less, in some instances. As a result of the BSR technique 600, the user's experience of the application may be uninterrupted and not negatively affected (e.g., jitter, skipping, freezing, etc.).

Figure 7:
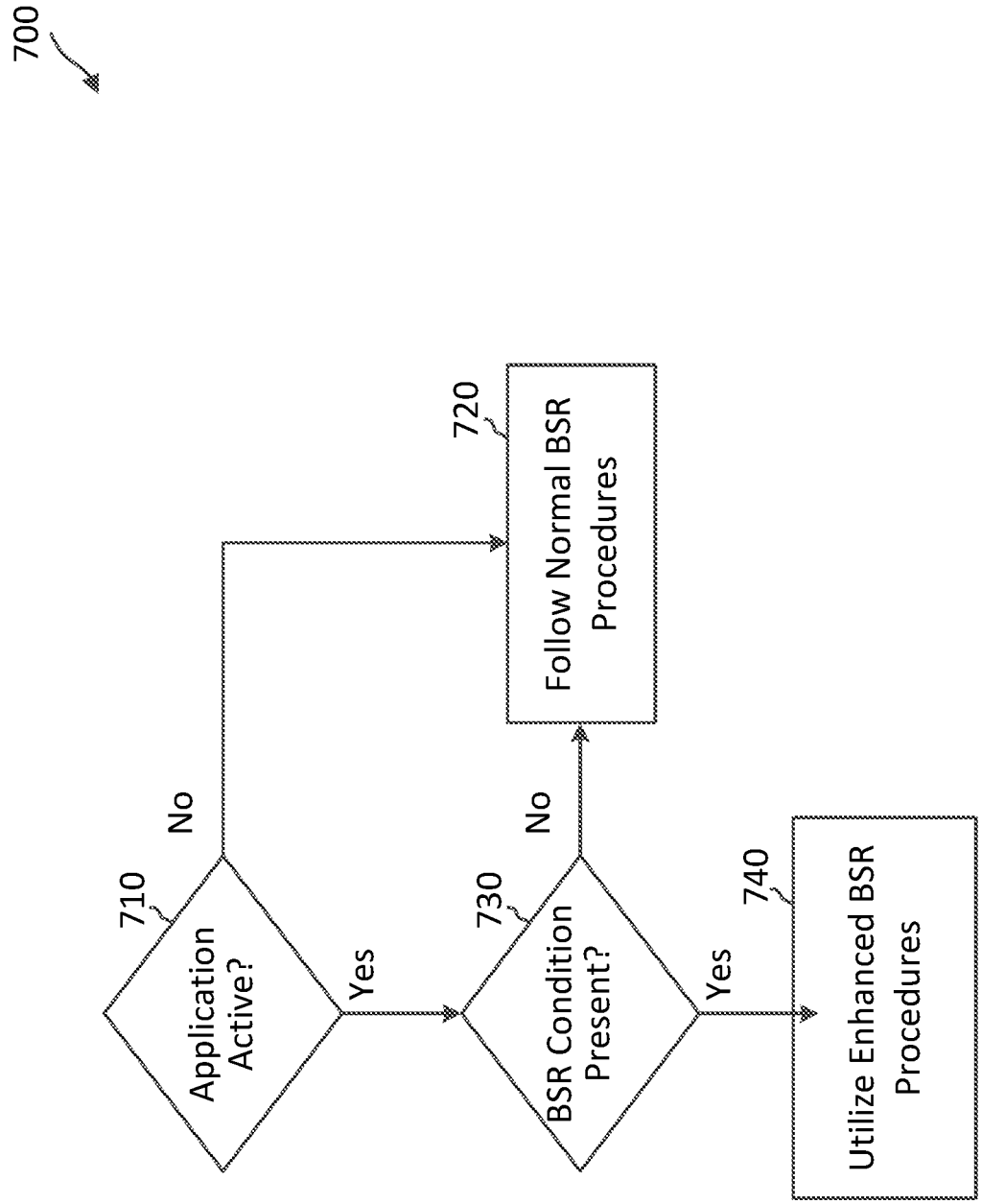
FIG. 7 is a flow diagram of a wireless communication method according to some aspects of the present disclosure.

FIG. 7 is a flow diagram of a wireless communication method 700 according to some aspects of the present disclosure. Aspects of the method 700 can be executed by a computing device (e.g., a processor, processing circuit, and/or other suitable component) of a wireless communication device or other suitable means for performing the steps. For example, a wireless communication device, such as the UE 115, 215, or 800, may utilize one or more components, such as the processor 802, the memory 804, the BSR module 808, the transceiver 810, the modem 812, and the one or more antennas 816, to execute the steps of method 700. The method 700 may employ similar mechanisms to the BSR techniques 300, 400, 500, and/or 600 described above with respect to FIGS. 3, 4, 5, and/or 6, respectively. As illustrated, the method 700 includes a number of enumerated steps, but aspects of the method 700 may include additional steps before, after, and in between the enumerated steps. In some aspects, one or more of the enumerated steps may be omitted or performed in a different order.

At 710, the method 700 includes determining whether an application is active. In some instances, whether the application is active is determined based on at least one of an IP tuple, a quality of service (QoS) flow indicator (QFI), or an application-specific indicator. That is, the presence of an IP tuple associated with the application, a QFI associated with the application, and/or an application-specific indicator associated with the application can be utilized to determine the application is active in some instances. If, at 710, the application is not active, then the method 700 continues to 720 where the UE follows normal BSR procedures. If, at 710, the application is active, then the method 700 continues to 730.

At 730, the method 700 includes determining whether a BSR condition is present. In some instances, whether the BSR condition is present is determined based on a condition of the application, based on the UE transitioning between a dual connectivity mode and a stand-alone mode (e.g., from dual connectivity to stand-alone, or vice versa), based on the data in the buffer of the UE satisfying a threshold (e.g., based on an amount of data, an amount of time, and/or a combination of an amount of data and an amount of time), based on a failure of a hybrid automatic repeat request (HARQ) for a previous BSR (e.g., a previous regular BSR), and/or based on an uplink grant not being available for the UE to transmit data (e.g., data associated with the application) in a buffer of the UE within a period of time. If, at 730, the BSR condition is not present, then the method 700 continues to 720 where the UE follows normal BSR procedures. If, at 730, the BSR condition is present, then the method 700 continues to 740.

At 740, the method 700 includes utilizing enhanced BSR procedures. In this regard, the enhanced BSR procedures can include aspects of the BSR techniques 500 and 600 described above with respect to FIGS. 5 and 6, as well as aspects of the wireless communication method 1000 described below with respect to FIG. 10. For example, in accordance with the enhanced BSR procedures of the present disclosure, the presence of the BSR condition at 730 can trigger a regular BSR. In this regard, the regular BSR can be triggered based on the BSR condition being present even if under normal BSR procedures (e.g., under 3gpp TS 38.321 v.16.2, Section 5.4.5 Buffer Status Reporting) a regular BSR may not be triggered. Further, the enhanced BSR procedures of the present disclosure can include removing data from the buffer of the UE. In some instances, the data is removed from the buffer of the UE by moving at least a portion of the data from the buffer to an application module (e.g., moving the data into higher layer memory associated with the application). In some instances, the data is removed from the buffer by dropping all or a portion of the data. That is, the data that is dropped can be discarded or otherwise not transmitted to a BS. In some instances, the data removed from the buffer is resubmitted to the buffer to trigger a regular BSR (e.g., as a result of a zero to non-zero state change and/or the presence of higher priority data in the LCG).

Figure 8:
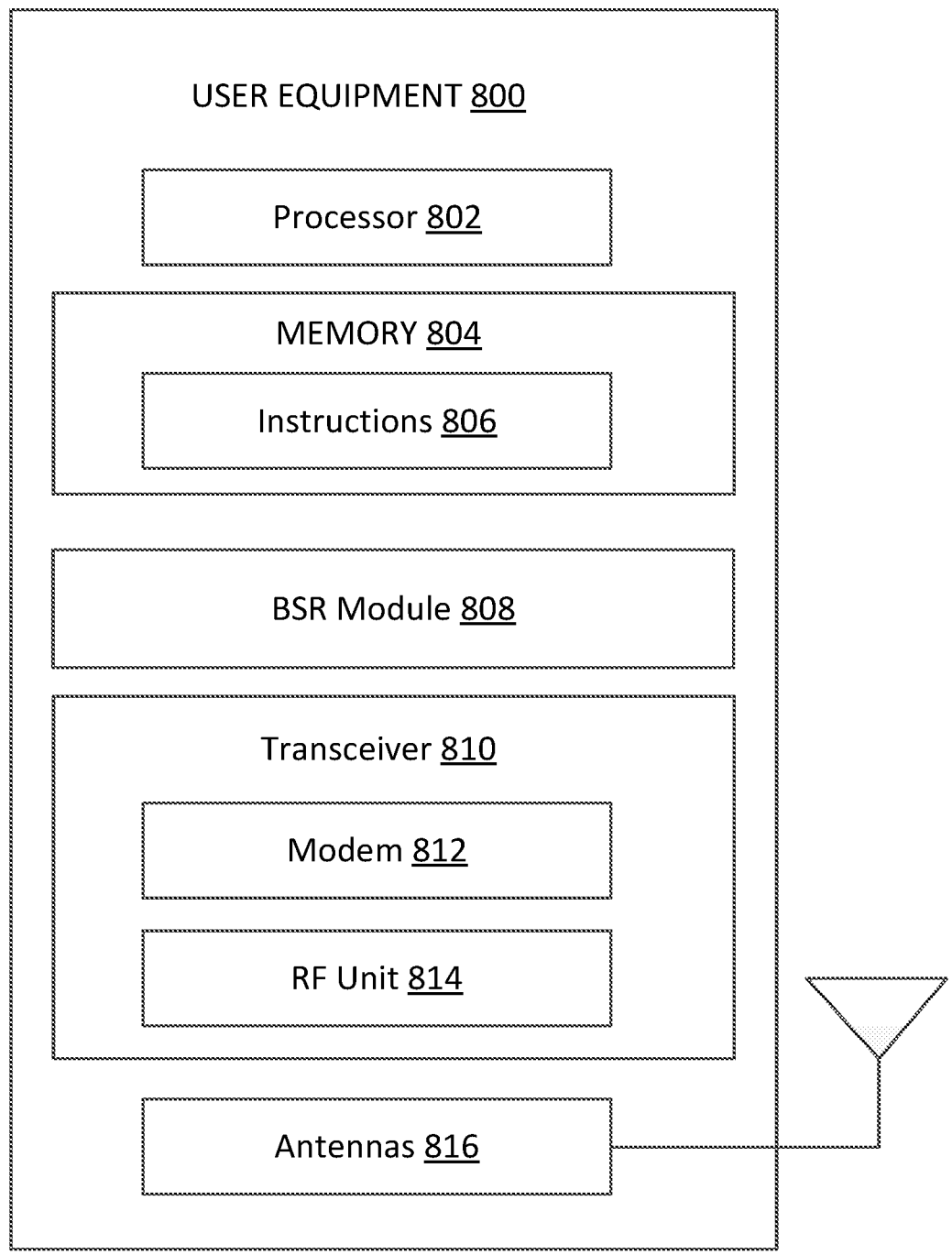
FIG. 8 is a block diagram of a user equipment (UE) according to some aspects of the present disclosure.

FIG. 8 is a block diagram of an exemplary UE 800 according to some aspects of the present disclosure. The UE 800 may be a UE 115 discussed above in FIG. 1 or a UE 215 discussed above in FIG. 2. As shown, the UE 800 may include a processor 802, a memory 804, a BSR module 808, a transceiver 810 including a modem subsystem 812 and a radio frequency (RF) unit 814, and one or more antennas 816. These elements may be in direct or indirect communication with each other, for example via one or more buses.

The processor 802 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid-state memory device, hard disk drives, other forms of volatile and non-volatile memory, or a combination of different types of memory. In an aspect, the memory 804 includes a non-transitory computer-readable medium. The memory 804 may store, or have recorded thereon, instructions 806. The instructions 806 may include instructions that, when executed by the processor 802, cause the processor 802 to perform the operations described herein with reference to the UEs 115, 215 in connection with aspects of the present disclosure, for example, aspects of FIGS. 2-7 and 10. Instructions 806 may also be referred to as program code. The program code may be for causing a wireless communication device to perform these operations, for example by causing one or more processors (such as processor 802) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The BSR module 808 may be implemented via hardware, software, or combinations thereof. For example, the BSR module 808 may be implemented as a processor, circuit, and/or instructions 806 stored in the memory 804 and executed by the processor 802. In some examples, the BSR module 808 can be integrated within the modem subsystem 812. For example, the BSR module 808 can be implemented by a combination of software components (e.g., executed by a DSP or a general processor) and hardware components (e.g., logic gates and circuitry) within the modem subsystem 812.

The BSR module 808 may be used for various aspects of the present disclosure, for example, aspects of FIGS. 2-7 and 10. The BSR module 808 is configured to determine a buffer status report (BSR) condition is present. In some instances, the BSR module 808 determines the BSR condition is present based on a condition of an application. In some cases, the condition of the application is that the application is active. In some instances, the BSR module 808 determines the application is active based on at least one of an IP tuple, a quality of service (QoS) flow indicator (QFI), or an application-specific indicator. That is, in some instances the presence of an IP tuple associated with the application, a QFI associated with the application, and/or an application-specific indicator associated with the application can be utilized by the BSR module 808 to determine the application is active. In some cases, the condition of the application is that the application is encountering one or more performance issues related to the transmission of UL data packets. For example, in some instances the BSR module 808 determines the BSR condition is present based on the application dropping one or more packets, changing a codec (e.g., moving to a lower resolution codec and/or a lower bandwidth codec), and/or otherwise adjusting performance parameters. In some instances, the BSR module 808 determines the BSR condition is present based on the UE transitioning between a dual connectivity mode and a stand-alone mode (e.g., from dual connectivity to stand-alone, or vice versa). In some cases, the UE determines the BSR condition is present based on the UE transitioning between a dual connectivity LTE and NR mode to an LTE-only mode. In some instances, the BSR module 808 determines the BSR condition is present based on the data in the buffer of the UE satisfying a threshold. In this regard, the threshold can be based on an amount of data, an amount of time, and/or a combination of an amount of data and an amount of time. In some instances, the BSR module 808 determines the BSR condition is present based on a failure of a hybrid automatic repeat request (HARQ) for a previous BSR, such as a previous regular BSR.

In some instances, the BSR module 808 determines an uplink grant is not available for the UE to transmit data in a buffer of the UE within a period of time. In some instances, the data in the buffer is related to the application. In some cases, the period of time is based on the operating parameters of the application. In some instances, the period of time may be variable or change over time based on a status (e.g., UL data load) of the application.

In some instances, the BSR module 808 removes the data from the buffer of the UE. In some instances, the BSR module 808 removes the data from the buffer of the UE by moving at least a portion of the data from the buffer to an application module. For example, the data in the buffer may be moved to a higher layer memory associated with the application. In some instances, the BSR module 808 removes the data from the buffer by dropping all or a portion of the data. In some instances, the data removed from the buffer is then resubmitted to the buffer by the BSR module 808 for UL transmission by the transceiver 810.

As shown, the transceiver 810 may include the modem subsystem 812 and the RF unit 814. The transceiver 810 can be configured to communicate bi-directionally with other devices, such as the BSs 105. The modem subsystem 812 may be configured to modulate and/or encode the data from the memory 804 and/or the BSR module 808 according to a modulation and coding scheme (MCS), e.g., a low-density parity check (LDPC) coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., PUCCH, PUSCH, ACK/NACKs, SR, BSR, MAC-CE, RLC status poll, etc.) from the modem subsystem 812 (on outbound transmissions) or of transmissions originating from another source such as another UE 115 or a BS 105 (e.g., RRC configurations; UL grants, etc.). The RF unit 814 may be further configured to perform analog beamforming in conjunction with the digital beamforming. Although shown as integrated together in transceiver 810, the modem subsystem 812 and the RF unit 814 may be separate devices that are coupled together at the UE 800 to enable the UE 800 to communicate with other devices. Further, as noted above, in some instances the modem subsystem 812 includes a buffer (e.g., memory) that stores UL data associated with one or more upper layer applications of the UE 800.

The RF unit 814 may provide the modulated and/or processed data, e.g. data packets (or, more generally, data messages that may contain one or more data packets and other information), to the antennas 816 for transmission to one or more other devices. The antennas 816 may further receive data messages transmitted from other devices. The antennas 816 may provide the received data messages for processing and/or demodulation at the transceiver 810. The transceiver 810 may provide the demodulated and decoded data (e.g., RRC configurations; UL grants; split radio bearer configurations, standalone radio bearer configurations, PDCCH, PDSCH, ACK/NACKs, RLC status poll, etc.) to the BSR module 808 and/or the processor 802 for processing. The antennas 816 may include multiple antennas of similar or different designs in order to sustain multiple transmission links. The RF unit 814 may configure the antennas 816.

In an aspect, the UE 800 can include multiple transceivers 810 implementing different RATs (e.g., NR and LTE). In an aspect, the UE 800 can include a single transceiver 810 implementing multiple RATs (e.g., NR and LTE). In an aspect, the transceiver 810 can include various components, where different combinations of components can implement different RATs.

In some cases, the transceiver 810 is configured to transmit, to a base station (BS), at least one of a BSR or a scheduling request (SR) based at least in part on a BSR condition being present and an uplink grant not being available for the UE to transmit data in the buffer of the UE within a period of time. In some cases, transceiver 810 may transmit an SR to the BS. In some instances, the transceiver 810 receives an UL grant from the BS in response to the SR. In some cases, the UL grant can allow the transceiver 810 to transmit a BSR (e.g., a regular BSR) to the BS.

In some cases, the transceiver 810 transmits a regular BSR to the BS at 1030. Further, in some instances the transceiver 810 transmits the regular BSR to the BS prior to expiration of a BSR retransmission timer. In some instances, the transceiver 810 receives an uplink grant from the BS in response to the regular BSR. In this regard, the UL grant can be sufficient for the transceiver 810 to transmit the data in the buffer related to the application without adverse effect to the operations, execution, and/or user experiences related to the application.

Figure 9:
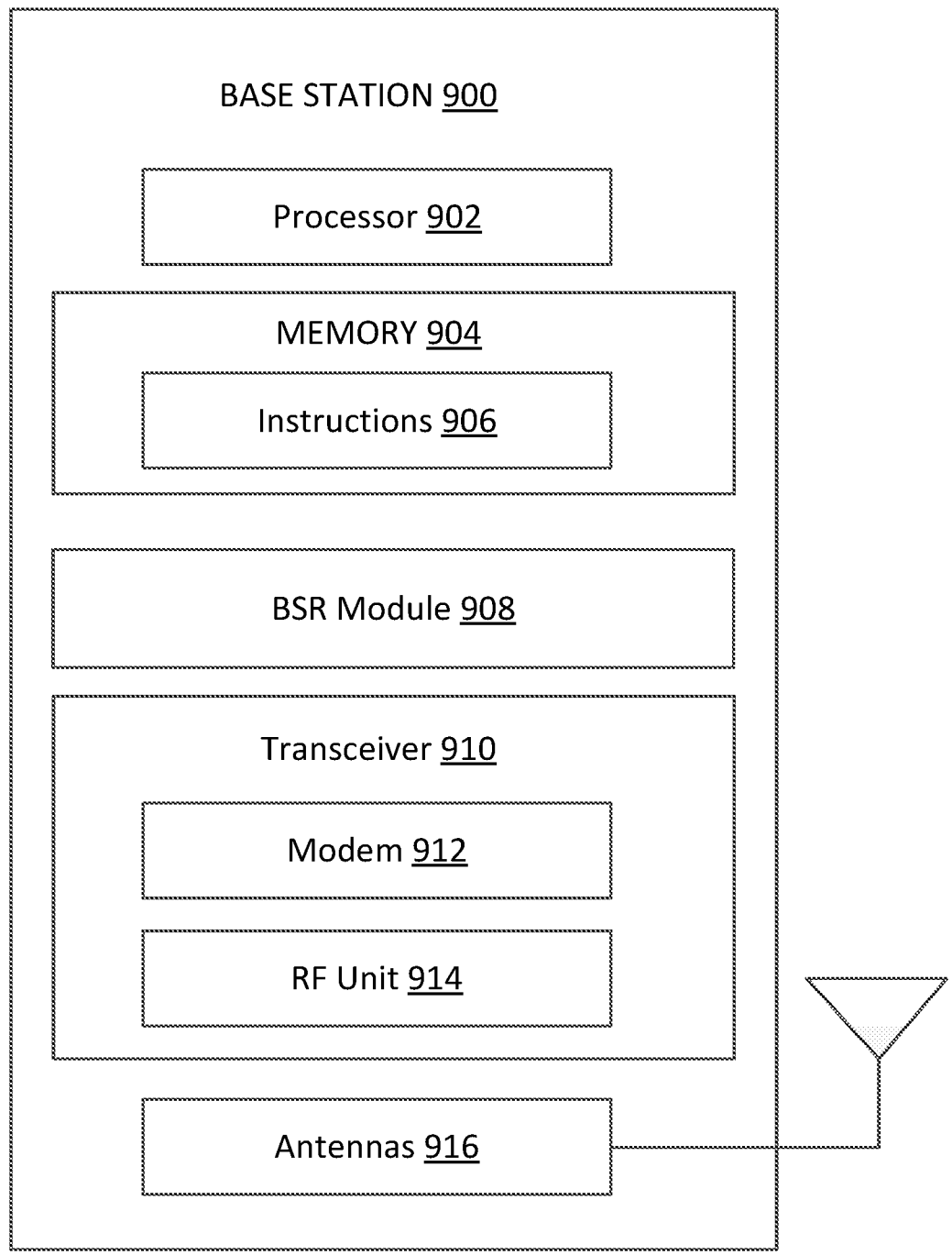
FIG. 9 is a block diagram of an exemplary base station (BS) according to some aspects of the present disclosure.

FIG. 9 is a block diagram of an exemplary BS 900 according to some aspects of the present disclosure. The BS 900 may be a BS 105 in the network 100 as discussed above in FIG. 1. As shown, the BS 900 may include a processor 902, a memory 904, a BSR module 908, a transceiver 910 including a modem subsystem 912 and a RF unit 914, and one or more antennas 916. These elements may be in direct or indirect communication with each other, for example via one or more buses.

The processor 902 may have various features as a specific-type processor. For example, these may include a CPU, a DSP, an ASIC, a controller, a FPGA device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 904 may include a non-transitory computer-readable medium. The memory 904 may store instructions 906. The instructions 906 may include instructions that, when executed by the processor 902, cause the processor 902 to perform operations described herein, for example, aspects of FIGS. 2-3 and 6-10. Instructions 906 may also be referred to as code, which may be interpreted broadly to include any type of computer-readable statement(s) as discussed above with respect to FIG. 4.

The BSR module 908 may be implemented via hardware, software, or combinations thereof. For example, the BSR module 908 may be implemented as a processor, circuit, and/or instructions 906 stored in the memory 904 and executed by the processor 902. In some examples, the BSR module 908 can be integrated within the modem subsystem 912. For example, the BSR module 908 can be implemented by a combination of software components (e.g., executed by a DSP or a general processor) and hardware components (e.g., logic gates and circuitry) within the modem subsystem 912. The BSR module 908 may be used for various aspects of the present disclosure, for example, aspects of aspects of FIGS. 2-7.

As shown, the transceiver 910 may include the modem subsystem 912 and the RF unit 914. The transceiver 910 can be configured to communicate bi-directionally with other devices, such as the UEs 115, 215, and/or 800 and/or another core network element. The modem subsystem 912 may be configured to modulate and/or encode data according to a MCS, e.g., a LDPC coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., RRC configurations, UL grants, a split radio bearer configuration, standalone radio bearer configuration, PDCCH, PDSCH, ACK/NACKs, RLC status poll, etc.) from the modem subsystem 912 (on outbound transmissions) or of transmissions originating from another source such as a UE 115, 215, and/or UE 800 (e.g., SR, BSR, MAC-CE, etc.). The RF unit 914 may be further configured to perform analog beamforming in conjunction with the digital beamforming. Although shown as integrated together in transceiver 910, the modem subsystem 912 and/or the RF unit 914 may be separate devices that are coupled together at the BS 105 to enable the BS 105 to communicate with other devices.

The RF unit 914 may provide the modulated and/or processed data, e.g. data packets (or, more generally, data messages that may contain one or more data packets and other information), to the antennas 916 for transmission to one or more other devices. This may include, for example, transmission of information to complete attachment to a network and communication with a camped UE 115, 215, or 800 according to some aspects of the present disclosure. The antennas 916 may further receive data messages transmitted from other devices and provide the received data messages for processing and/or demodulation at the transceiver 910. The transceiver 910 may provide the demodulated and decoded data (e.g., SR, BSR, MAC-CE, PUCCH, PUSCH, ACK/NACKs, RLC status poll, etc.) to the BSR module 908 and/or the processor 902 for processing. The antennas 916 may include multiple antennas of similar or different designs to sustain multiple transmission links. In an aspect, the BS 900 can include multiple transceivers 910 implementing different RATs (e.g., NR and LTE). In an aspect, the BS 900 can include a single transceiver 910 implementing multiple RATs (e.g., NR and LTE). In an aspect, the transceiver 910 can include various components, where different combinations of components can implement different RATs.

In some cases, the transceiver 910 is configured to receive, from a UE, at least one of a BSR or a scheduling request (SR). In some cases, transceiver 910 may transmit an UL grant to the UE in response to the SR and/or the BSR. In some cases, the UL grant can allow the UE to transmit a BSR (e.g., a regular BSR) to the transceiver 910. In some cases, the UL grant can be sufficient for the UE to transmit data in a buffer of the UE related to an application.

Figure 10:
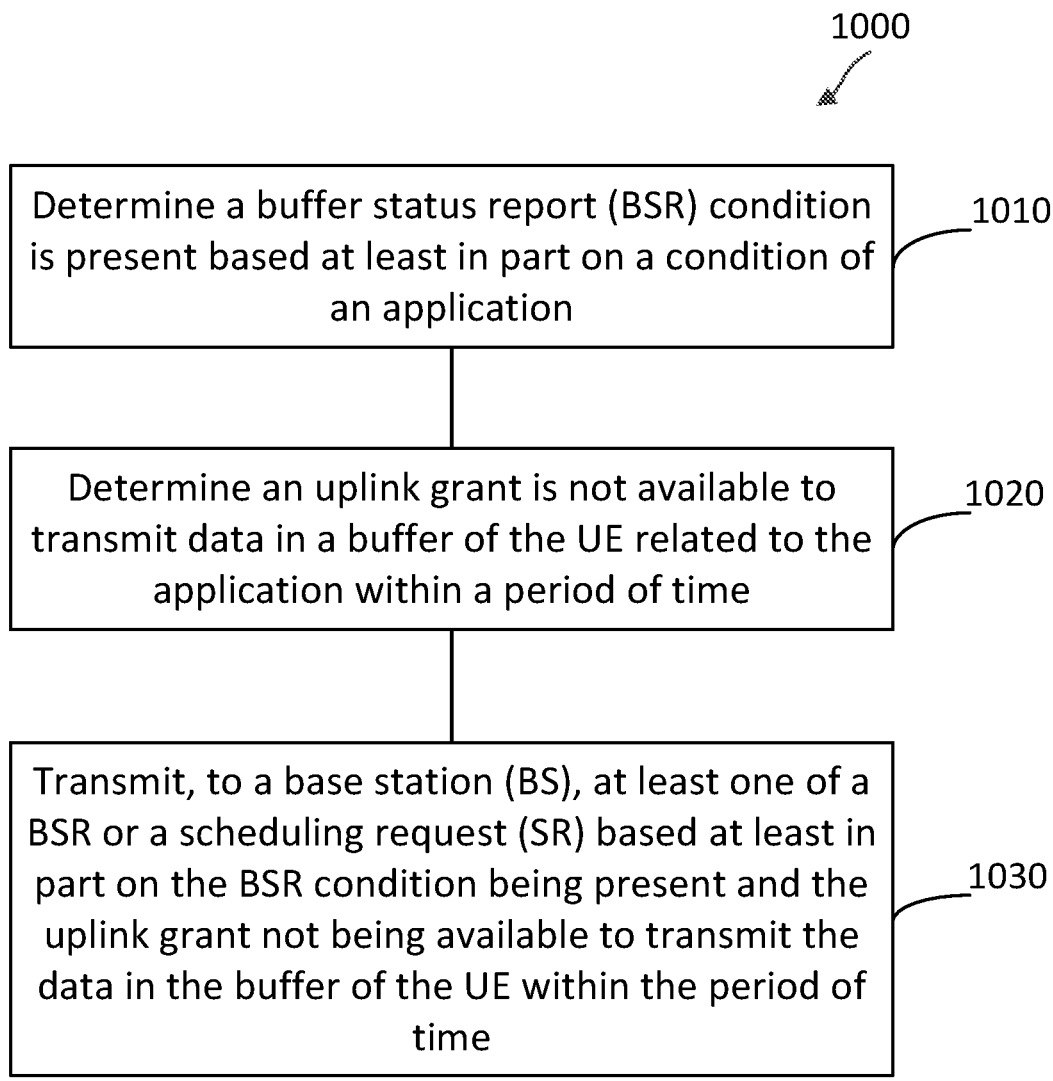
FIG. 10 is a flow diagram of a wireless communication method according to some aspects of the present disclosure.

FIG. 10 is a flow diagram of a wireless communication method 1000 according to some aspects of the present disclosure. Aspects of the method 1000 can be executed by a computing device (e.g., a processor, processing circuit, and/or other suitable component) of a wireless communication device or other suitable means for performing the steps. For example, a wireless communication device, such as the UE 115, 215, or 800, may utilize one or more components, such as the processor 802, the memory 804, the BSR module 808, the transceiver 810, the modem 812, and the one or more antennas 816, to execute the steps of method 1000. The method 1000 may employ similar mechanisms as in the BSR techniques 300, 400, 500, and/or 600 described above with respect to FIGS. 3, 4, 5, and/or 6, respectively, as well as similar mechanisms as in method 700 described above with respect to FIG. 7. As illustrated, the method 1000 includes a number of enumerated steps, but aspects of the method 1000 may include additional steps before, after, and in between the enumerated steps. In some aspects, one or more of the enumerated steps may be omitted or performed in a different order.

At block 1010, the UE determines a buffer status report (BSR) condition is present. In some instances, the UE determines the BSR condition is present based on a condition of an application. In some cases, the condition of the application is that the application is active. In some instances, the UE determines the application is active based on at least one of an IP tuple, a quality of service (QoS) flow indicator (QFI), or an application-specific indicator. That is, in some instances the presence of an IP tuple associated with the application, a QFI associated with the application, and/or an application-specific indicator associated with the application can be utilized by the UE to determine the application is active. In some cases, the condition of the application is that the application is encountering one or more performance issues related to the transmission of UL data packets. For example, in some instances the UE determines the BSR condition is present based on the application dropping one or more packets, changing a codec (e.g., moving to a lower resolution codec and/or a lower bandwidth codec), and/or otherwise adjusting performance parameters.

In some instances, the UE determines the BSR condition is present based on the UE transitioning between a dual connectivity mode and a stand-alone mode (e.g., from dual connectivity to stand-alone, or vice versa). In some cases, the UE determines the BSR condition is present based on the UE transitioning between a dual connectivity LTE and NR mode to an LTE-only mode. In some instances, the UE determines the BSR condition is present based on the type of RAT the UE is connected to or supported by the BS, including for example whether the UE is connected to a terrestrial RAT (e.g., NR, LTE, 3G, etc.) and/or a non-terrestrial RAT (e.g., a satellite-based RAT). In some instances, the UE determines the BSR condition is present based on the type of BS the UE is connected to, including for example whether the UE is connected to a terrestrial BS (e.g., a BS attached to or part of a tower, building, vehicle, or other structure on earth), a non-terrestrial BS (e.g., a BS attached to or part of a satellite, balloon, or other device separate from earth), and/or other type(s) of BS. In some instances, the UE determines the BSR condition is present based on whether the UE is operating in a dual active and/or a dual standby mode (e.g., when the UE is a multi-SIM UE).

In some instances, the UE determines the BSR condition is present based on the data in the buffer of the UE satisfying a threshold. In this regard, the threshold can be based on an amount of data, an amount of time, and/or a combination of an amount of data and an amount of time. For example, in some cases if the amount of data related to the application stored in the buffer satisfies a threshold amount (e.g., greater than X kilobytes), then the BSR condition is present. Further, in some cases if the data related to the application stored in the buffer satisfies a threshold time (e.g., greater than Y ms), then the BSR condition is present. Further still, in some cases if the amount of data related to the application stored in the buffer satisfies a threshold amount (e.g., greater than X kilobytes) for a threshold time (e.g., greater than Y ms), then the BSR condition is present. The particular value(s) of the threshold(s) may be based on the operating parameters of the application and/or user detectability of delays in clearing the data from the buffer. For example, applications that generate real-time data streams (e.g., video and/or audio) may have relatively strict timing requirements (e.g., 100-150 ms) before jitter, freezing, and/or other issues adversely affect the user's experience with the application. Accordingly, in some instances the threshold amount of data and/or the threshold time may be set to facilitate the operation of the application in a manner that preserves a good user experience. In some instances, the threshold(s) may be variable or change over time based on a status (e.g., UL data load) of the application.

In some instances, the UE determines the BSR condition is present based on a condition of one or more sensors (e.g., temperature sensor(s), motion sensor(s), accelerometer(s), pressure sensor(s), speed/velocity sensor(s), etc.) associated with the UE. The UE may include the one or more sensors and/or be coupled to and/or in communication with one or more external sensors. In some instances, the UE determines the BSR condition is present based on a measurement of one or more of the sensors satisfying a threshold (e.g., above or below a temperature threshold, above or below a pressure threshold, above or below a motion threshold, above or below a speed/velocity threshold, etc.).

At block 1020, the UE determines an uplink grant is not available for the UE to transmit data in a buffer of the UE within a period of time. In some instances, the data in the buffer is related to the application. In some cases, the period of time is based on the operating parameters of the application. For example, as noted above, applications that generate real-time data streams (e.g., video and/or audio) may have relatively strict timing requirements (e.g., 100-150 ms) before jitter, freezing, and/or other issues adversely affect the user's experience with the application. Accordingly, in some instances the period of time in which the UE determines an UL grant is not available to transmit the data in the buffer may be based on the timing requirements needed for operation of the application in a manner that preserves a good user experience. In some instances, the period of time may be variable or change over time based on a status (e.g., UL data load) of the application.

At block 1030, the UE transmits, to a base station (BS), at least one of a BSR or a scheduling request (SR) based at least in part on the BSR condition being present and the uplink grant not being available for the UE to transmit the data in the buffer of the UE within the period of time. In some cases, the UE does not have any available UL grants for transmitting a BSR upon determining that a BSR condition is present (e.g., similar to FIG. 5). Accordingly, the UE may transmit an SR to the BS. In some instances, the UE receives an UL grant from the BS in response to the SR. In some cases, the UL grant can allow the UE to transmit a BSR (e.g., a regular BSR) to the BS.

In some cases, the UE has an available uplink grant and transmits a BSR using the available uplink grant (e.g., similar to FIG. 6) at 1030. In some instances, the UE transmits a regular BSR to the BS at 1030. Further, in some instances the UE transmits the regular BSR to the BS prior to expiration of a BSR retransmission timer. In some instances, the UE receives an uplink grant from the BS in response to the regular BSR. In this regard, the UL grant can be sufficient for the UE to transmit the data in the buffer related to the application without adverse effect to the operations, execution, and/or user experiences related to the application.

In some instances, the method 1000 includes the UE removing the data from the buffer of the UE. In some instances, the UE removes the data from the buffer of the UE by moving at least a portion of the data from the buffer to an application module. For example, the data in the buffer may be moved to a higher layer memory associated with the application. In some instances, the UE removes the data from the buffer by dropping all or a portion of the data. In some instances, the data removed from the buffer is then resubmitted to the buffer in anticipation of UL transmission. By removing the data from the buffer and either dropping all or a portion of the data and/or reintroducing all or a portion of the data back into the buffer, the buffer may transition from a zero state (after removal of the data) to a non-zero state (reintroduction of data or introduction of new data) with respect to data associated with the application, which can trigger the transmission of a regular BSR to the BS.

As discussed above, in some instances the UE determines the uplink grant is not available for the UE to transmit the data in the buffer of the UE and transmits the BSR in the context of a transition between dual connectivity and stand-alone modes, reconfiguration of the UE, and/or other conditions caused by variable radio network conditions. In some instances, the UE determines the uplink grant is not available for the UE to transmit the data in the buffer of the UE and transmits the BSR during a steady state connection of the UE to a network. That is, in some instances one or more BSR conditions may be present even during a steady state connection of the UE to a network and the UE may utilize similar BSR techniques as described herein.

In some instances, the UE determines the BSR condition is present based on a failure of a hybrid automatic repeat request (HARQ) for a previous BSR. In some cases, the previous BSR is a regular BSR. In this regard, if the previous BSR is not successfully received by the BS, then the UE will not receive an ACK (or UL grant) from the BS. Whereas some communications (e.g., RLC AM PDUs) have an ability for retransmission in the event of HARQ failure, under normal BSR procedures (e.g., 3gpp TS 38.321 v.16.2, Section 5.4.5 Buffer Status Reporting) a UE may be required to wait for expiration of a BSR retransmission timer before attempting to retransmit a regular BSR. However, in accordance with the present disclosure, in some cases the failure of the HARQ for the previous BSR can cause the UE to determine a BSR condition is present and proceed to transmit, at block 1030, another regular BSR prior to expiration of the BSR retransmission timer associated with the previous BSR transmission (e.g., similar to the BSR techniques 500 and 600 of FIGS. 5 and 6, respectively).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
    determining a buffer status report (BSR) condition is present based on a condition of an application;
    determining an uplink grant is not available for the UE to transmit data, related to the application, in a buffer of the UE within a period of time;
    removing, based at least in part on the BSR condition being present and the uplink grant not being available for the UE to transmit the data in the buffer within the period of time, the data from the buffer;
    resubmitting, to the buffer, at least a portion of the data removed from the buffer; and
    transmitting, to a base station (BS), at least one of a BSR or a scheduling request (SR) based at least in part on a zero to non-zero state change in the buffer resulting from the removing the data from the buffer and the resubmitting the at least the portion of the data to the buffer.

2. The method of claim 1, wherein the determining the BSR condition is present based on the condition of the application comprises:
    determining the application is active based on at least one of an IP tuple, a quality of service (QOS) flow indicator (QFI), or an application-specific indicator.

3. The method of claim 1, wherein the determining the BSR condition is present based on the condition of the application comprises:
    determining the BSR condition is present based on at least one of:
        the application dropping one or more packets;
        the application changing a codec; or
        a failure of a hybrid automatic repeat request (HARQ) for a previous BSR.

4. The method of claim 1, wherein the determining the BSR condition is present further comprises:
    determining the BSR condition is present based on the UE transitioning between a dual connectivity mode and a stand-alone mode.

5. The method of claim 1, wherein the determining the BSR condition is present further comprises:
    determining the BSR condition is present based on the data in the buffer of the UE satisfying a threshold.

6. The method of claim 1, wherein the removing the data from the buffer of the UE comprises:
    moving at least the portion of the data from the buffer to an application module.

7. The method of claim 1, wherein the determining the BSR condition is present further comprises:
    determining the BSR condition is present based on at least one of:
        a type of radio access technology (RAT) supported by the BS;
        a multi-subscriber identity module (multi-SIM) connection mode of the UE; or
        a condition of one or more sensors associated with the UE.

8. The method of claim 1, wherein the transmitting the at least one of the BSR or the SR comprises:
    transmitting, to the BS, a regular BSR.

9. A user equipment (UE), comprising:
    a processor;
    a buffer memory in communication with the processor; and
    a transceiver in communication with the processor, wherein the user equipment is configured to:
        determine a buffer status report (BSR) condition is present based on a condition of an application; and
        determine an uplink grant is not available for the UE to transmit data, related to the application, in the buffer memory of the UE within a period of time;
        remove, based at least in part on the BSR condition being present and the uplink grant not being available for the UE to transmit the data in the buffer memory within the period of time, the data from the buffer memory;
        resubmit, to the buffer memory, at least a portion of the data removed from the buffer memory; and
        transmit, to a base station (BS), at least one of a BSR or a scheduling request (SR) based at least in part on the at least the portion of the data being resubmitted to the buffer memory.

10. The UE of claim 9, wherein the UE is further configured to:
determine the BSR condition is present by determining the application is active based on at least one of an IP tuple, a quality of service (QOS) flow indicator (QFI), or an application-specific indicator.

11. The UE of claim 9, wherein the UE is further configured to:
determine the BSR condition is present based on at least one of:
the application dropping one or more packets;
the application changing a codec; or
a failure of a hybrid automatic repeat request (HARQ) for a previous BSR.

12. The UE of claim 9, wherein the UE is further configured to:
determine the BSR condition is present based on the UE transitioning between a dual connectivity mode and a stand-alone mode.

13. The UE of claim 9, wherein the UE is further configured to:
determine the BSR condition is present based on the data in the buffer of the UE satisfying a threshold.

14. The UE of claim 9, wherein the UE is further configured to:
remove the data from the buffer memory by moving at least the portion of the data from the buffer memory to an application module.

15. The UE of claim 9, wherein the UE is further configured to:
determine the BSR condition is present based on at least one of:
a type of radio access technology (RAT) supported by the BS;
a multi-subscriber identity module (multi-SIM) connection mode of the UE; or
a condition of one or more sensors associated with the UE.

16. The UE of claim 9, wherein the UE is further configured to:
transmit, to the BS, a regular BSR.

17. The UE of claim 16, wherein the UE is further configured to:
transmit the regular BSR based on a zero to non-zero state change in the buffer memory resulting from the removing the data from the buffer memory and the resubmitting the at least the portion of the data to the buffer memory.

18. A non-transitory computer-readable medium having program code recorded thereon for wireless communication by a user equipment (UE), the program code comprising:
code for causing the UE to determine a buffer status report (BSR) condition is present based on a condition of an application;
code for causing the UE to determine an uplink grant is not available for the UE to transmit data, related to the application, in a buffer of the UE within a period of time;
code for causing the UE to remove, based at least in part on the BSR condition being present and the uplink grant not being available for the UE to transmit the data in the buffer within the period of time, the data from the buffer;
code for causing the UE to resubmit, to the buffer, at least a portion of the data removed from the buffer; and
code for causing the UE to transmit, to a base station (BS), at least one of a BSR or a scheduling request (SR) based at least in part on the resubmitting the at least the portion of the data to the buffer.

19. The non-transitory computer-readable medium of claim 18, wherein the code for causing the UE to determine the BSR condition is present based on the condition of the application comprises:
code for causing the UE to determine the application is active based on at least one of an IP tuple, a quality of service (QOS) flow indicator (QFI), or an application-specific indicator.

20. The non-transitory computer-readable medium of claim 18, wherein the code for causing the UE to determine the BSR condition is present based on the condition of the application comprises at least one of:
code for causing the UE to determine the BSR condition is present based on the application performing at least one of dropping one or more packets or changing a codec;
code for causing the UE to determine the BSR condition is present based on the UE transitioning between a dual connectivity mode and a stand-alone mode;
code for causing the UE to determine the BSR condition is present based on the data in the buffer of the UE satisfying a threshold; or
code for causing the UE to determine the BSR condition is present based on a failure of a hybrid automatic repeat request (HARQ) for a previous BSR.

21. The non-transitory computer-readable medium of claim 18, wherein the code for causing the UE to remove the data from the buffer of the UE comprises:
code for causing the UE to move at least the portion of the data from the buffer to an application module.

22. The non-transitory computer-readable medium of claim 18, wherein the code for causing the UE to transmit the at least one of the BSR or the SR comprises:
code for causing the UE to transmit, to the BS, a regular BSR.

23. The non-transitory computer-readable medium of claim 22, wherein the code for causing the UE to transmit the regular BSR comprises:
code for causing the UE to transmit the regular BSR based on a zero to non-zero state change in the buffer resulting from the removing the data from the buffer and the resubmitting the at least the portion of the data to the buffer.

24. A user equipment (UE), comprising:
means for determining a buffer status report (BSR) condition is present based on a condition of an application;
means for determining an uplink grant is not available for the UE to transmit data, related to the application, in a buffer of the UE within a period of time;
means for removing, based at least in part on the BSR condition being present and the uplink grant not being available for the UE to transmit the data in the buffer within the period of time, the data from the buffer;
means for resubmitting, to the buffer, at least a portion of the data removed from the buffer; and
means for transmitting, to a base station (BS), at least one of a BSR or a scheduling request (SR) based at least in part on the resubmitting the at least the portion of the data to the buffer.

25. The UE of claim 24, wherein the means for determining the BSR condition is present based on the condition of the application comprises:

means for determining the application is active based on at least one of an IP tuple, a quality of service (QOS) flow indicator (QFI), or an application-specific indicator.

26. The UE of claim 24, wherein the means for determining the BSR condition is present based on the condition of the application comprises at least one of:
   means for determining the BSR condition is present based on the application performing at least one of dropping one or more packets or changing a codec;
   means for determining the BSR condition is present based on the UE transitioning between a dual connectivity mode and a stand-alone mode;
   means for determining the BSR condition is present based on the data in the buffer of the UE satisfying a threshold; or
   means for determining the BSR condition is present based on a failure of a hybrid automatic repeat request (HARQ) for a previous BSR.

27. The UE of claim 24, wherein the means for removing the data from the buffer of the UE comprises:
   means for moving at least the portion of the data from the buffer to an application module.

28. The UE of claim 24, wherein the means for transmitting the at least one of the BSR or the SR comprises:
   means for transmitting, to the BS, a regular BSR.

29. The UE of claim 28, wherein the means for transmitting the regular BSR further comprises:
   means for transmitting the regular BSR based on a zero to non-zero state change in the buffer resulting from the removing the data from the buffer and the resubmitting the at least the portion of the data to the buffer.

* * * * *